US009781190B2

(12) United States Patent
Sakata et al.

(10) Patent No.: US 9,781,190 B2
(45) Date of Patent: Oct. 3, 2017

(54) APPARATUS AND METHOD FOR SUPPORTING SELECTION OF AN IMAGE TO BE POSTED ON A WEBSITE

(71) Applicant: Panasonic Intellectual Property Corporation of America, Torrance, CA (US)

(72) Inventors: Kotaro Sakata, Tokyo (JP); Tomoko Taihei, Kanagawa (JP); Nozomu Tooyama, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 215 days.

(21) Appl. No.: 14/596,485

(22) Filed: Jan. 14, 2015

(65) Prior Publication Data

US 2015/0205771 A1    Jul. 23, 2015

(30) Foreign Application Priority Data

Jan. 22, 2014   (JP) ................................. 2014-009509

(51) Int. Cl.
*G06F 17/00* (2006.01)
*H04L 29/08* (2006.01)
*G06F 17/30* (2006.01)
*H04L 29/06* (2006.01)

(52) U.S. Cl.
CPC .......... *H04L 67/02* (2013.01); *G06F 17/3089* (2013.01); *H04L 67/10* (2013.01); *H04L 67/30* (2013.01); *H04L 67/306* (2013.01); *H04L 67/42* (2013.01)

(58) Field of Classification Search
CPC . G06F 17/3089; G06K 9/00288; G06Q 50/01
See application file for complete search history.

(56) References Cited

U.S. PATENT DOCUMENTS 9,282,153 B2 * 3/2016 Kruglick ................. H04L 67/22
2005/0256733 A1 * 11/2005 Nagai .................. A45D 44/005
705/1.1

(Continued)

FOREIGN PATENT DOCUMENTS

JP   2004-015080   1/2004
JP   2004-029868   1/2004

(Continued)

*Primary Examiner* — Laurie Ries
(74) *Attorney, Agent, or Firm* — Wenderoth, Lind & Ponack, L.L.P.

(57) ABSTRACT

A terminal apparatus includes an information receiver that receives, from a server apparatus, first webpage information, which enables a first user to specify an image to be posted on a first website, a storage that stores the received first webpage information, and an information processor that reads the first webpage information from the storage and that displays the first webpage information on a screen. In the screen, among a plurality of images, which are candidates for the image to be posted on the first website, an image selected on the basis of an image used in a second website is displayed at a position closer to the center of the screen than positions of other images are or displayed in a mode different from a mode in which the other images are displayed.

17 Claims, 24 Drawing Sheets

(56) References Cited

U.S. PATENT DOCUMENTS

| | | | |
|---|---|---|---|
| 2006/0158526 A1* | 7/2006 | Kashiwa | G11B 27/034 348/211.11 |
| 2007/0047780 A1* | 3/2007 | Hull | G06K 9/00442 382/124 |
| 2008/0059425 A1* | 3/2008 | Brock | G06F 17/3089 707/3 |
| 2009/0044113 A1* | 2/2009 | Jones | G06T 13/40 715/707 |
| 2009/0307168 A1* | 12/2009 | Bockius | G06F 17/30867 706/46 |
| 2011/0004922 A1* | 1/2011 | Bono | G06F 21/6263 726/4 |
| 2011/0083106 A1* | 4/2011 | Hamagishi | G06F 3/017 715/836 |
| 2011/0119584 A1* | 5/2011 | Kaufman | G06F 3/0481 715/716 |
| 2012/0120110 A1* | 5/2012 | Chae | G06F 3/0484 345/660 |
| 2013/0042282 A1* | 2/2013 | Shinohara | H04N 21/4725 725/82 |
| 2013/0232430 A1* | 9/2013 | Reitan | G06F 3/0484 715/765 |
| 2014/0003716 A1* | 1/2014 | Fedorovskaya | G06K 9/00677 382/170 |
| 2014/0029859 A1* | 1/2014 | Libin | G06K 9/00221 382/224 |
| 2014/0041056 A1* | 2/2014 | Stoop | G06F 21/6263 726/28 |
| 2014/0063061 A1* | 3/2014 | Reitan | G09G 3/003 345/633 |
| 2014/0156769 A1* | 6/2014 | Wan | H04L 51/32 709/206 |
| 2014/0328570 A1* | 11/2014 | Cheng | G11B 27/10 386/241 |
| 2014/0344948 A1* | 11/2014 | Hayato | G06F 21/6218 726/26 |
| 2015/0012525 A1* | 1/2015 | Lindsay | G06F 17/3053 707/722 |
| 2015/0033362 A1* | 1/2015 | Mau | G06K 9/00288 726/27 |

FOREIGN PATENT DOCUMENTS

| | | |
|---|---|---|
| JP | 2005-235139 | 9/2005 |
| JP | 2009-061039 | 3/2009 |
| JP | 2010-191831 | 9/2010 |
| JP | 2013-222278 | 10/2013 |

* cited by examiner

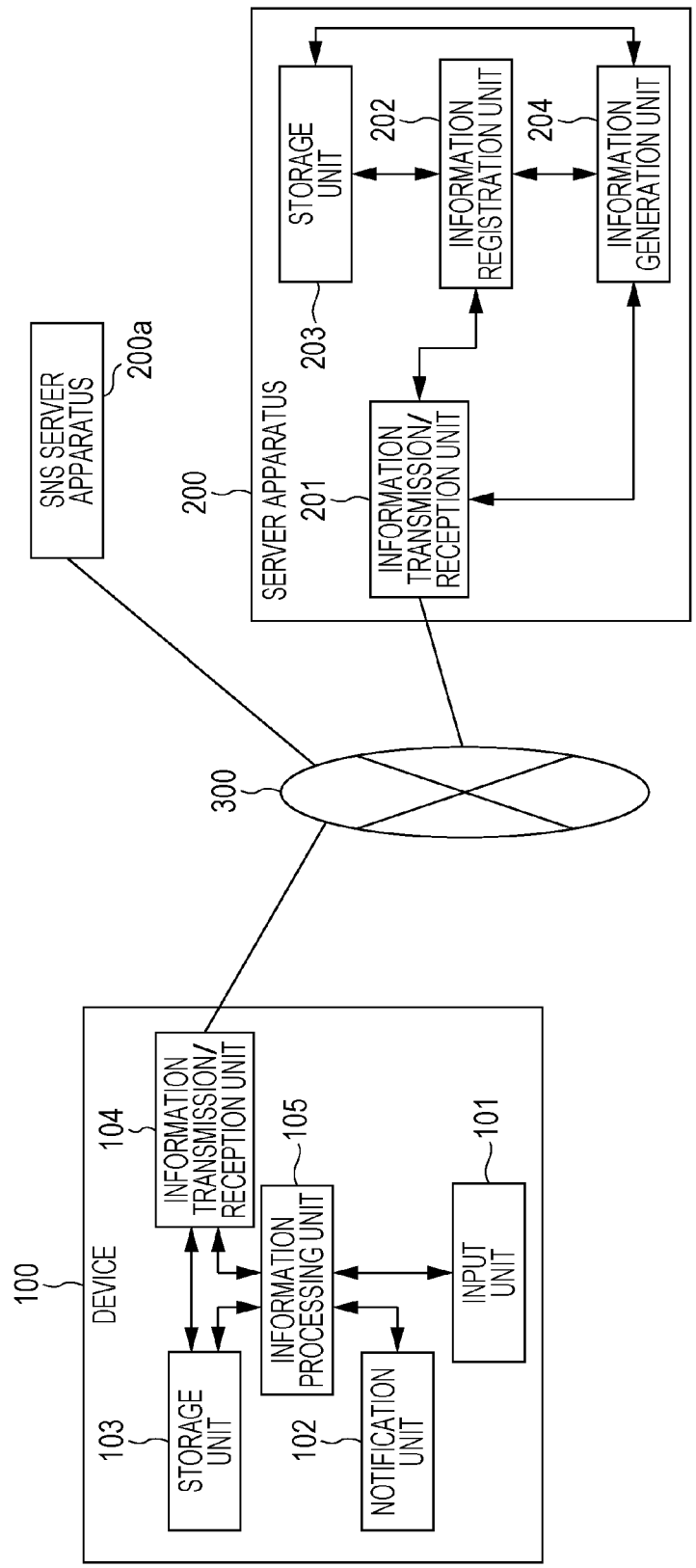

FIG. 3

| USER ID | CLOSE FRIEND ID | ACQUAINTANCE ID | SALON ID | STYLIST ID | HAIRSTYLE IMAGE | SCOPE OF DISCLOSURE | POSTED IMAGE | POSTED COMMENT | POSTING TIME | OTHERS' COMMENTS | EVALUATION |
|---|---|---|---|---|---|---|---|---|---|---|---|
| 1111 | 1001 | 1300 | A001 | B701 | xxx.jpg | CLOSE FRIEND ID | xxx.jpg | yyy.html | 2013/4/12/ 15:37:06 | — | 0 |
|  | 1002 | 1400 |  |  | ⋮ |  |  |  |  |  |  |
|  |  | 1500 |  |  | zzz.jpg |  |  |  |  |  |  |
| ⋮ | ⋮ | ⋮ | ⋮ | ⋮ | ⋮ | ⋮ | ⋮ | ⋮ | ⋮ | ⋮ | ⋮ |
| a | | | b | | | c | | d | | e | |

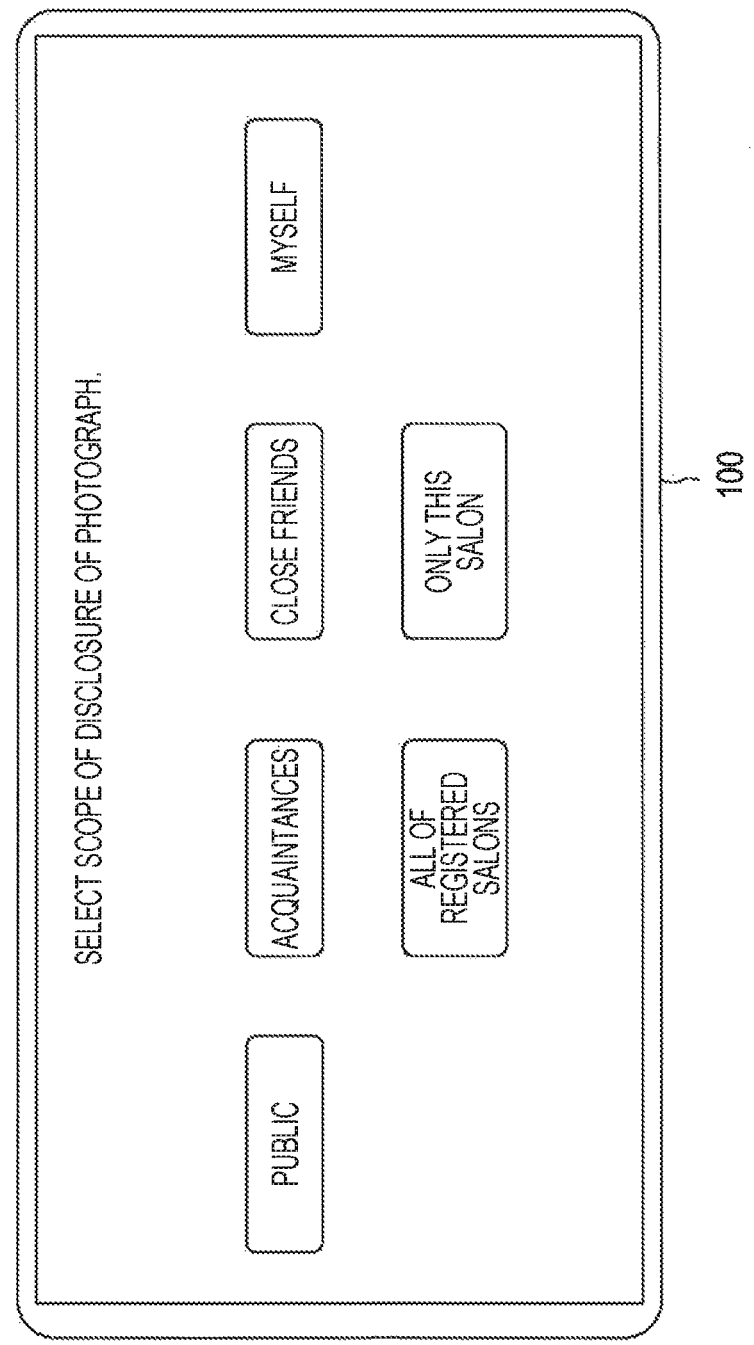

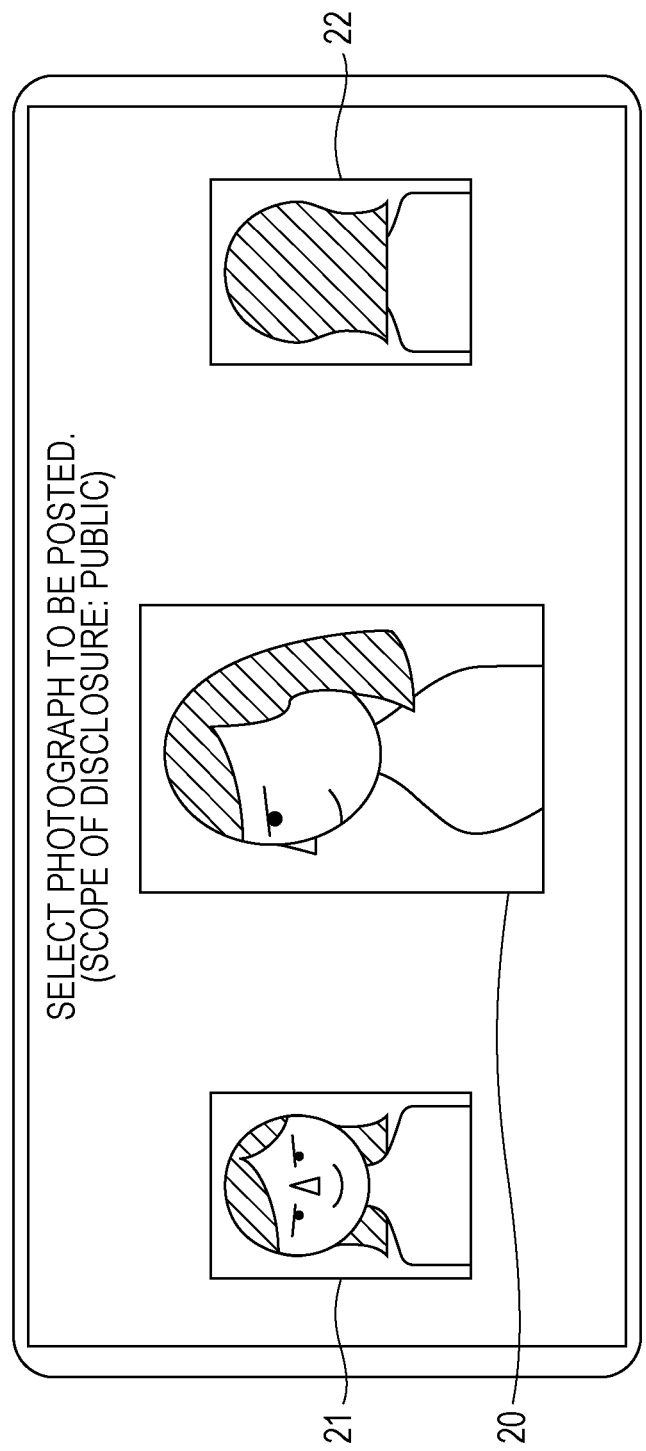

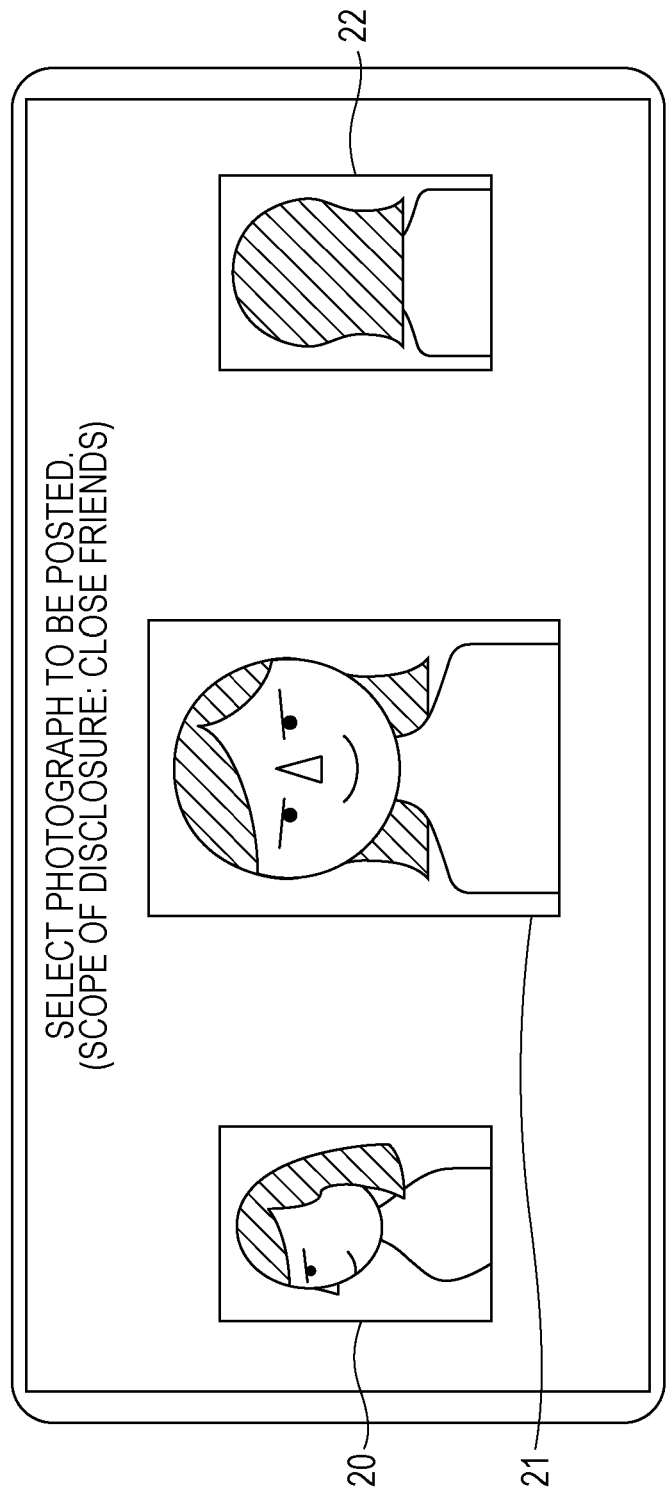

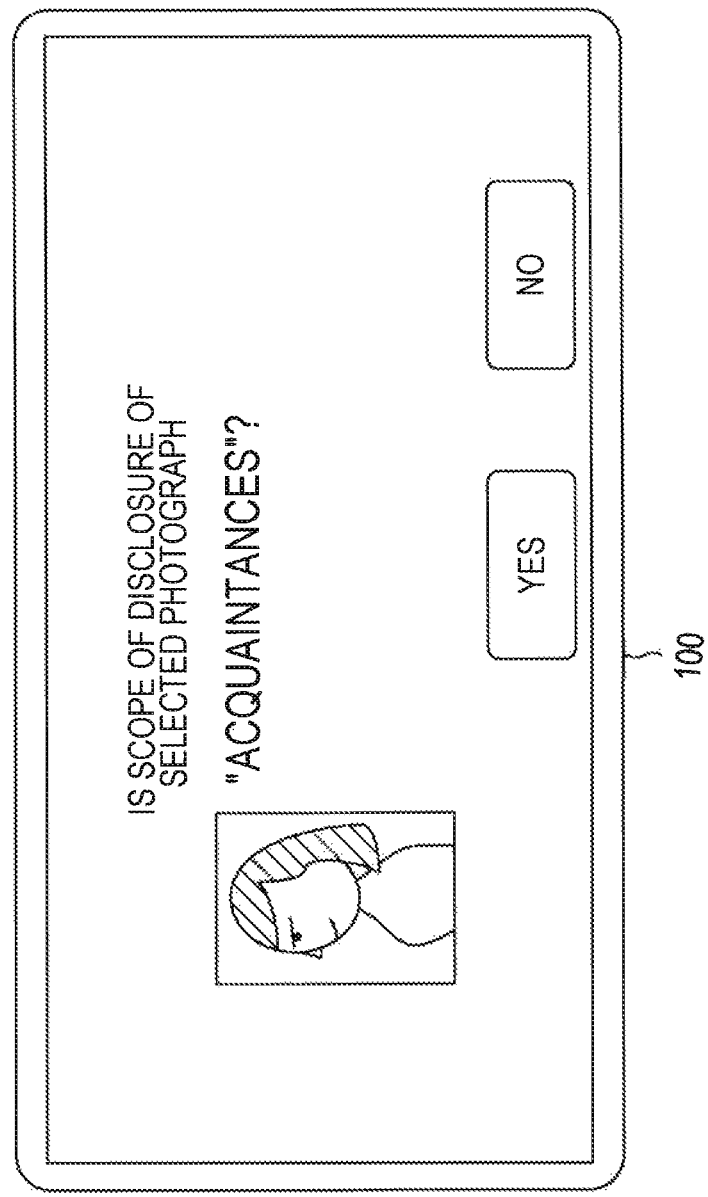

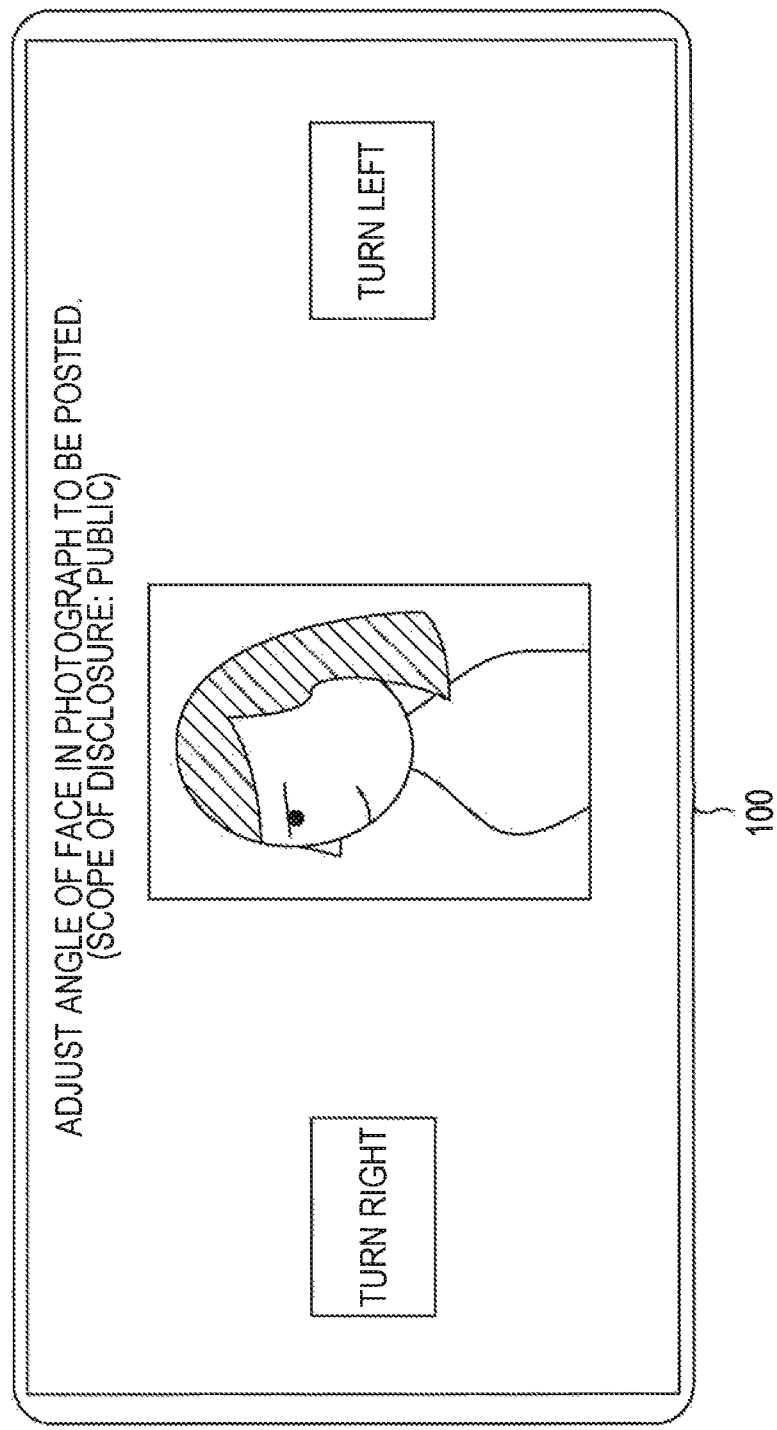

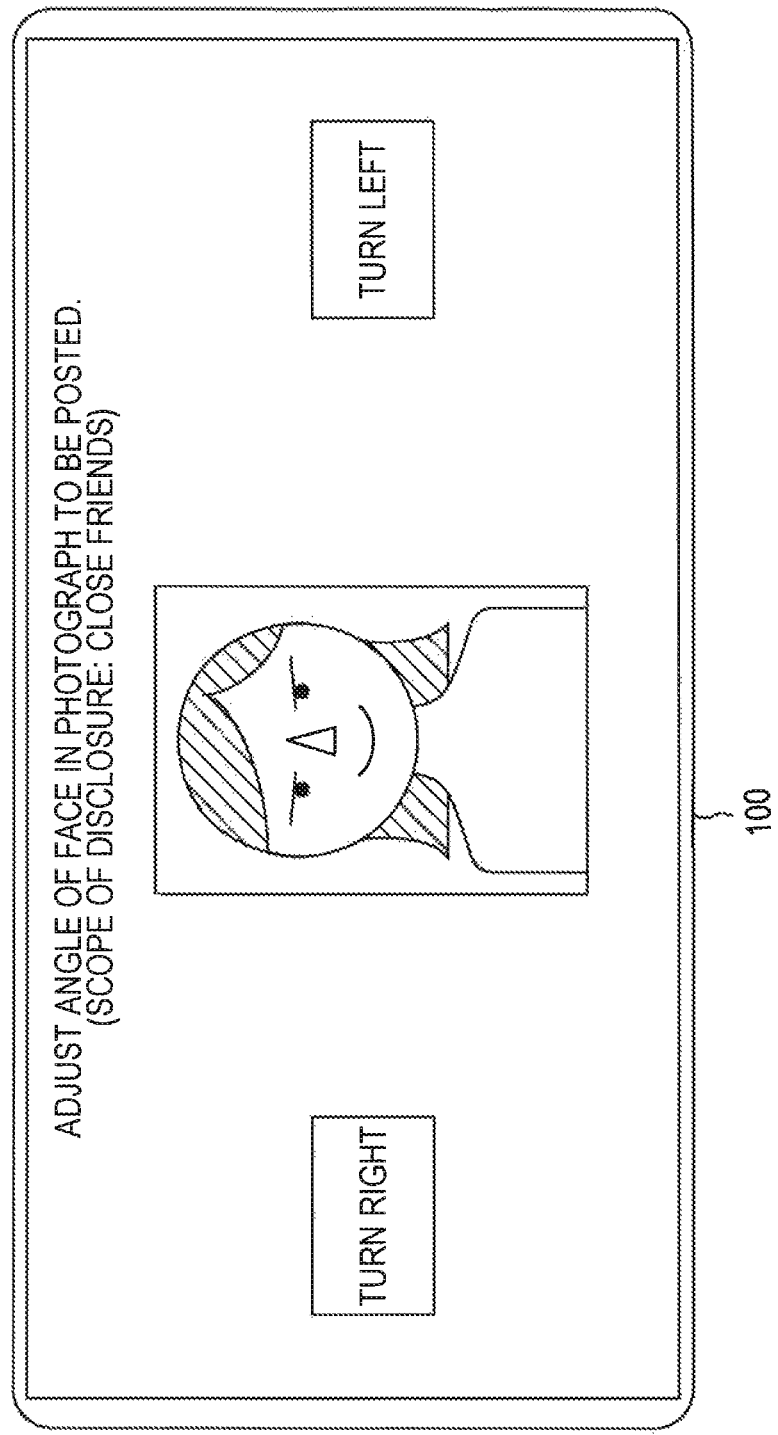

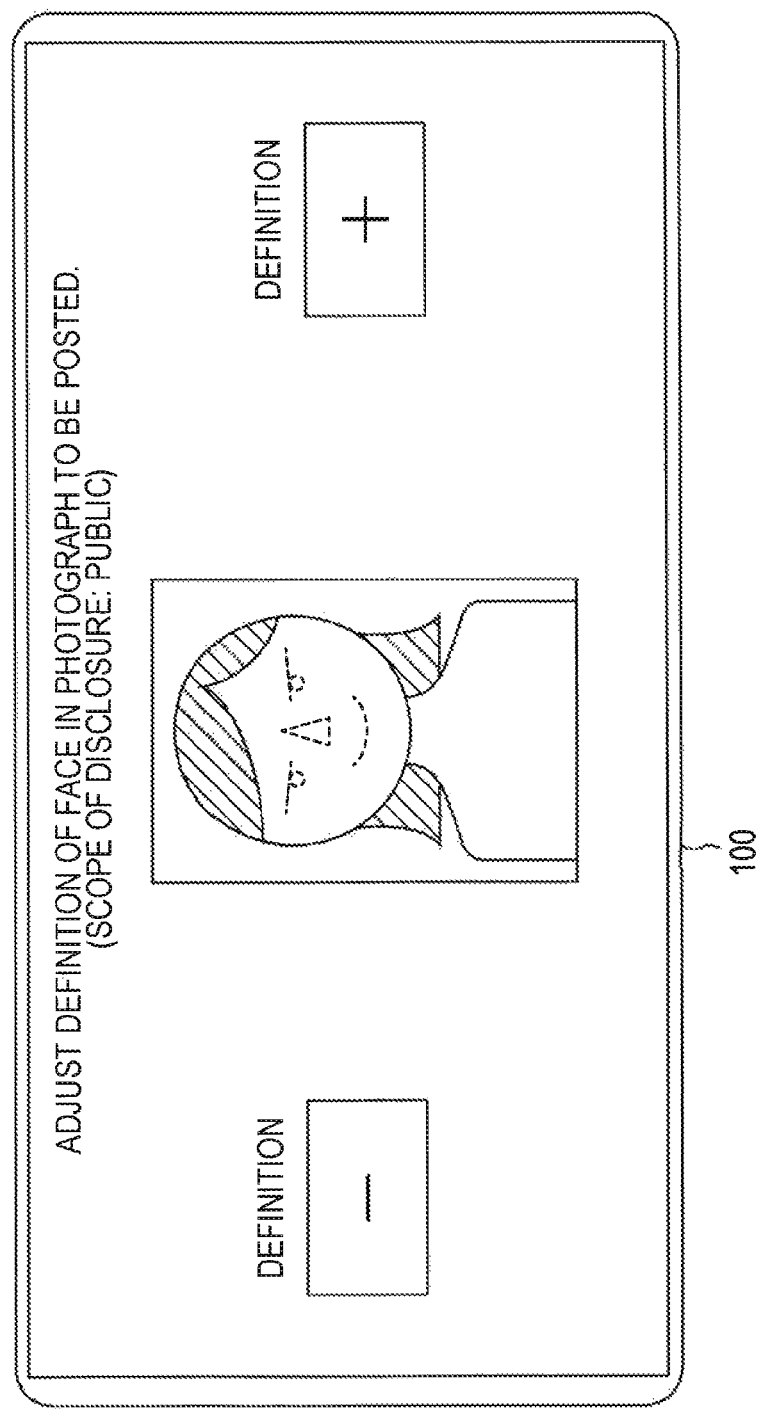

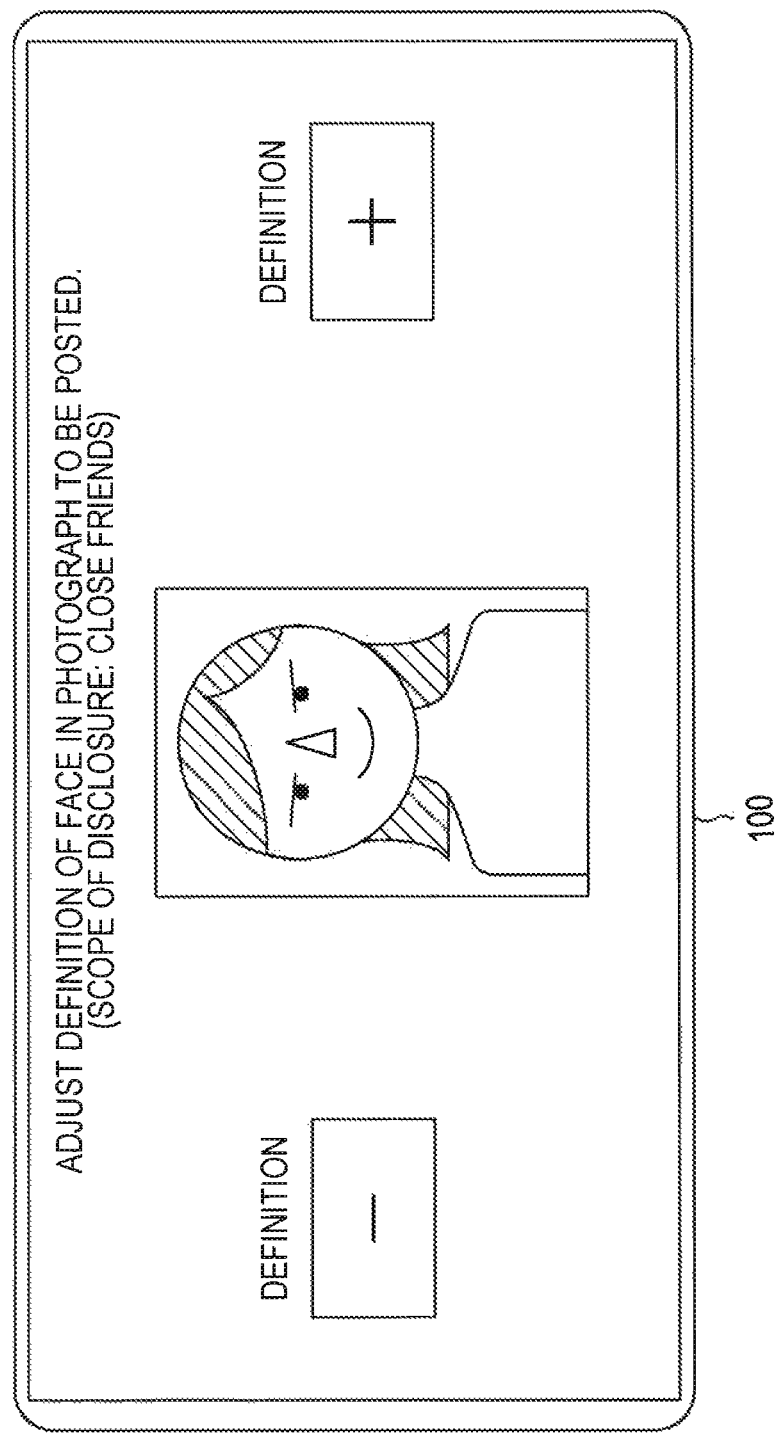

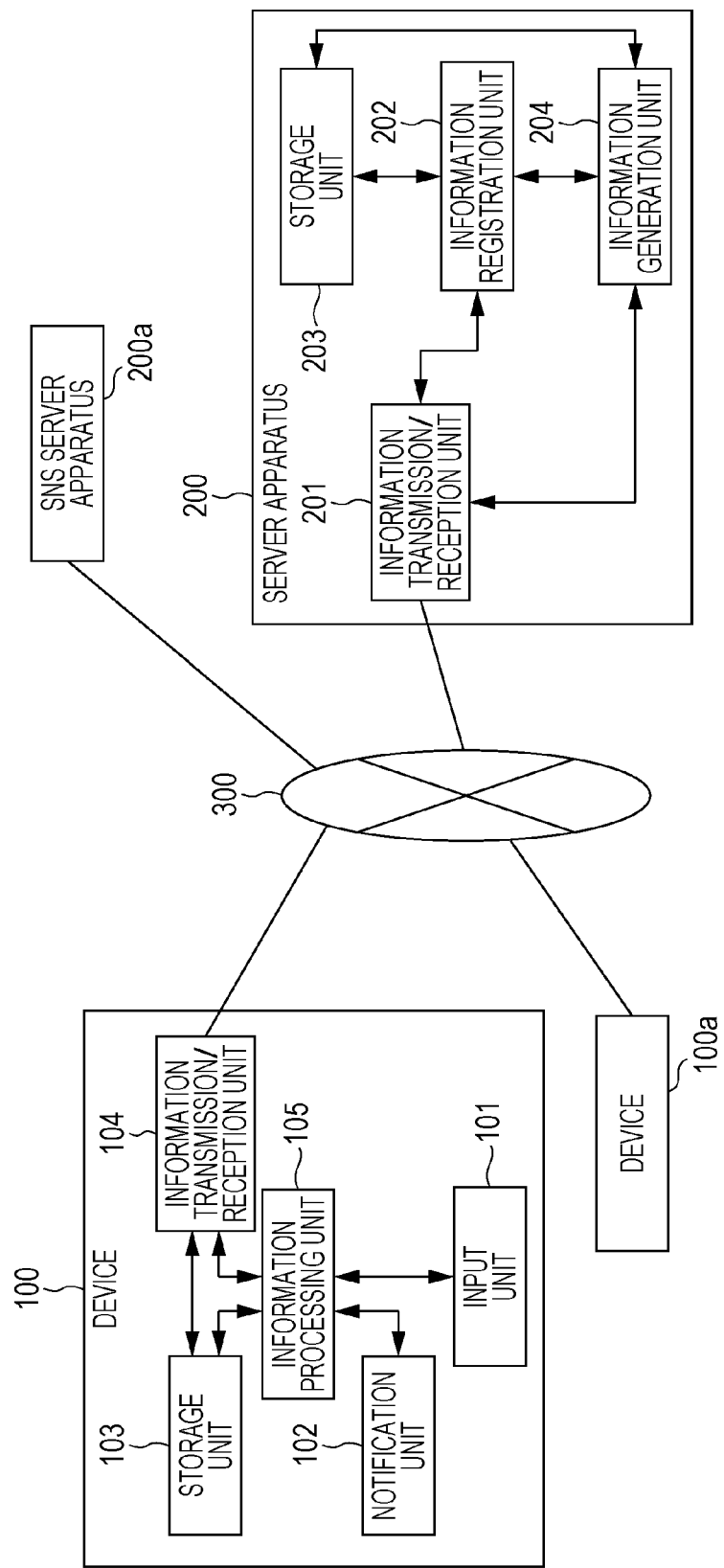

FIG. 11B

| | a | | b | | | c | | d | | e | |
|---|---|---|---|---|---|---|---|---|---|---|---|
| USER ID | CLOSE FRIEND ID | ACQUAINTANCE ID | SALON ID | STYLIST ID | HAIRSTYLE IMAGE | SCOPE OF DISCLOSURE | POSTED IMAGE | POSTED COMMENT | POSTING TIME | OTHERS' COMMENTS | EVALUATION |
| 1111 | 1001, 1002 | 1300, 1400, 1500 | A001 | B701 | xxx.jpg ... zzz.jpg | CLOSE FRIEND ID | xxx.jpg | yyy.html | 2013/4/12 15:37:06 | — | 0 |
| 1001 | 1111 | | | | | CLOSE FRIEND ID | | | | | |
| ... | | | ... | ... | ... | ... | ... | ... | ... | ... | ... |

APPARATUS AND METHOD FOR SUPPORTING SELECTION OF AN IMAGE TO BE POSTED ON A WEBSITE

CROSS REFERENCES TO RELATED APPLICATIONS

This application claims priority to Japanese Patent Application No. 2014-009509, filed on Jan. 22, 2014, the contents of which are hereby incorporated by reference.

BACKGROUND

1. Technical Field

The present disclosure relates to a terminal apparatus that supports posting of an image on a website, a server apparatus, a method for supporting posting of information, and a non-transitory recording medium storing a computer program.

2. Description of the Related Art

A system is currently known in which a server collects word-of-mouth information regarding evaluation targets from terminals and provides a website (hereinafter referred to as an "evaluation website") including the collected word-of-mouth information for the terminals. Users of the terminals can access the evaluation website to see the word-of-mouth information posted by other users and how a desired evaluation target has been evaluated. Examples of the evaluation targets include restaurants (for example, refer to Japanese Unexamined Patent Application Publication No. 2013-222278) and cosmetic products (for example, refer to Japanese Patent No. 4478479).

SUMMARY

In one general aspect, the techniques disclosed here feature a terminal apparatus that communicates with a server apparatus that provides a first website. The terminal apparatus includes an information receiver that receives, from the server apparatus, first webpage information, which enables a user to specify an image to be posted on the first website, a storage that stores the first webpage information received by the information receiver, and an information processor that reads the first webpage information from the storage and that displays the first webpage information on a screen. In the screen, among a plurality of images, which are candidates for the image to be posted on the first website, an image selected on the basis of an image used in a second website is displayed at a position closer to the center of the screen than positions of other images are or displayed in a mode different from a mode in which the other images are displayed.

Additional benefits and advantages of the disclosed embodiments will be apparent from the specification and Figures. The benefits and/or advantages may be individually provided by the various embodiments and features of the specification and drawings disclosed, and need not all be provided in order to obtain one or more of the same.

According to the present disclosure, privacy can be protected in posting of an image on the first website in accordance with a user's information disclosure policy.

These general and specific aspects may be implemented using a system, a method, and a computer program, and any combination of systems, methods, and computer programs.

BRIEF DESCRIPTION OF THE DRAWINGS

FIG. 2 is a block diagram illustrating an example of the configuration of the information posting support system according to a first embodiment of the present disclosure;

FIG. 3 is a diagram illustrating an example of a data table according to the first embodiment of the present disclosure;

FIG. 5 is a diagram illustrating an example of displayed first presentation information according to the first embodiment of the present disclosure;

FIG. 6A is a diagram illustrating an example of displayed second presentation information according to the first embodiment of the present disclosure;

FIG. 6B is a diagram illustrating another example of the displayed second presentation information according to the first embodiment of the present disclosure;

FIG. 8A is a diagram illustrating an example of displayed presentation information according to the first embodiment;

FIG. 9A is a diagram illustrating another example of the displayed second presentation information according to the first embodiment of the present disclosure;

FIG. 9B is a diagram illustrating another example of the displayed second presentation information according to the first embodiment of the present disclosure;

FIG. 10A is a diagram illustrating another example of the displayed second presentation information according to the first embodiment of the present disclosure;

FIG. 10B is a diagram illustrating another example of the displayed second presentation information according to the first embodiment of the present disclosure;

FIG. 11A is a block diagram illustrating an example of the configuration of an information posting support system according to a second embodiment of the present disclosure;

FIG. 11B is a diagram illustrating an example of a data table according to the second embodiment;

DETAILED DESCRIPTION

Figure 1A:
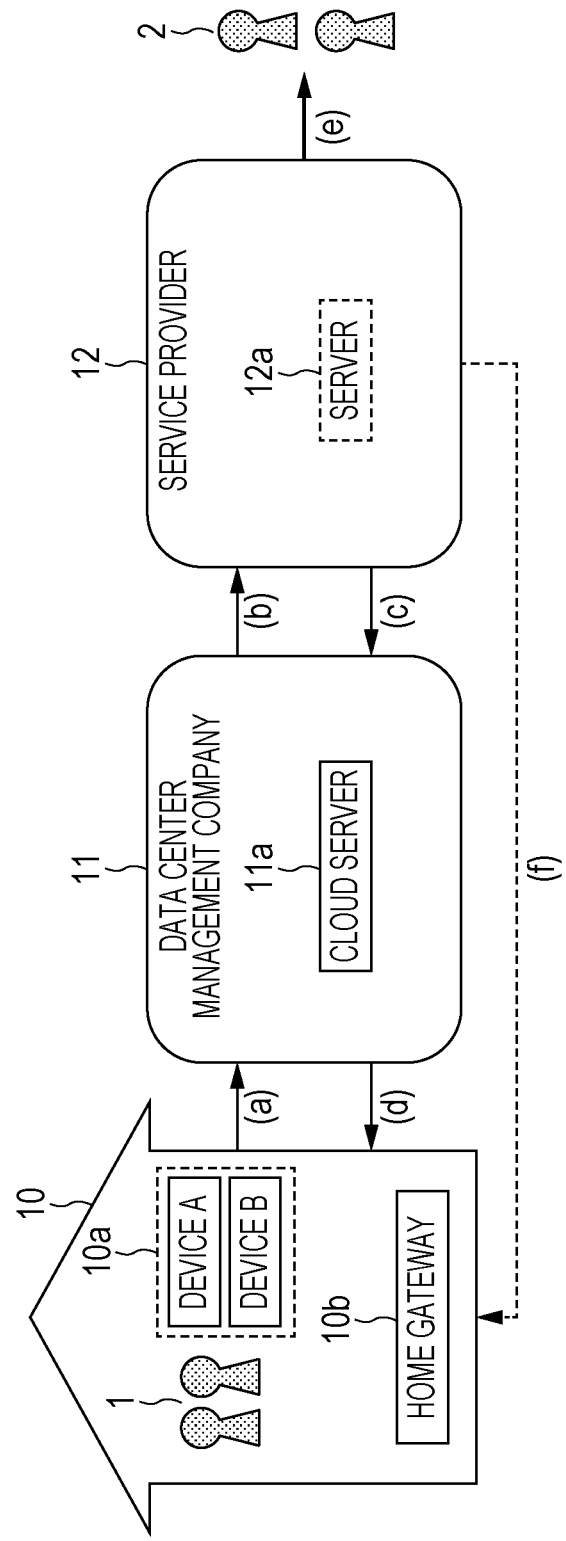
Fig. 1A is a diagram illustrating an overview of an information posting support system according to embodiments of the present disclosure.

First, what has been examined by the present inventors in order to establish embodiments of the present disclosure will be described.

Underlying Knowledge Forming Basis of the Present Disclosure

If an evaluation target of a system in an example of the related art is hairstyles arranged by hair salons or the like, photographs (images) of the hairstyles are posted as word-of-mouth information. The photographs, however, might include faces of users, and therefore privacy needs to be protected.

The present disclosure provides a terminal apparatus that realizes protection of privacy in posting of an image on a website in accordance with a user's information disclosure policy, a server apparatus, a method for supporting posting of information, and a non-transitory recording medium storing a computer program.

The terminal apparatus in the present disclosure is a terminal apparatus that communicates with a server apparatus that provides a first website. The terminal apparatus includes an information receiver that receives, from the server apparatus, first webpage information, which enables a first user to specify an image to be posted on the first website, a storage that stores the first webpage information received by the information receiver, and an information processor that reads the first webpage information from the storage and that displays the first webpage information on a screen. In the screen, among a plurality of images, which are candidates for the image to be posted on the first website, an image selected on the basis of an image used in a second website is displayed at a position closer to the center of the screen than positions of other images are or displayed in a mode different from a mode in which the other images are displayed.

By configuring the terminal apparatus in this manner, protection of privacy can be realized in posting of an image posted on the first website in accordance with the first user's information disclosure policy.

In the terminal apparatus in the present disclosure, in the screen, a plurality of images of the first user's head captured at different angles are displayed, and, among the plurality of images of the first user's head, an image selected on the basis of the image of the first user's head used in the second website is displayed at a position closer to the center of the screen than positions of other images are or displayed in a mode different from a mode in which the other images are displayed.

By configuring the terminal apparatus in this manner, the first user's information disclosure policy can be recognized on the basis of the image of the first user's head used in the second website. Therefore, in the posting of an image on the first website, an image according to the first user's information disclosure policy can be prominently displayed among the other images.

In the terminal apparatus in the present disclosure, in the screen, the selected image of the first user's head becomes larger than the other images of the first user's head and is displayed at the center of the screen.

By configuring the terminal apparatus in this manner, the first user's information disclosure policy can be recognized on the basis of the image of the first user's head used in the second website. Therefore, in the posting of an image on the first website, an image according to the first user's information disclosure policy can be prominently displayed among the other images.

In the terminal apparatus in the present disclosure, the mode in which the selected image is displayed, the mode being different from the mode in which the other images are displayed, may include the following modes: the selected image becomes larger than the other images; lines surrounding the selected image are displayed; and the selected image flashes.

By configuring the terminal apparatus in this manner, the first user's information disclosure policy can be recognized on the basis of the image of the first user's head used in the second website. Therefore, in the posting of an image on the first website, an image according to the first user's information disclosure policy can be prominently displayed among the other images, which are the plurality of candidates for the image to be posted.

In the terminal apparatus in the present disclosure, the first webpage information is separately displayed on the screen in accordance with scope of disclosure of each image posted on the first website, the scope of disclosure being specified in advance by the first user.

By configuring the terminal apparatus in this manner, each of the posted images can be disclosed within the scope of disclosure specified in advance by the first user.

In the terminal apparatus in the present disclosure, the information receiver receives, from the server apparatus, second webpage information including an image posted by a second user, scope of disclosure of the image including the first user. The information processor stores the second webpage information in the storage, and then reads the second webpage information from the storage and displays the second webpage information on the screen. The posted image and an input button for enabling the first user to input information indicating the first user's thought on the posted image are displayed on the screen.

By configuring the terminal apparatus in this manner, the information indicating the first user's thought on the image posted by the second user can be input.

In the terminal apparatus in the present disclosure, the storage includes a memory, and at least one of the information receiver and the information processor includes a processor.

The server apparatus in the present disclosure is a server apparatus that provides a first website for a terminal apparatus. The server apparatus includes an information receiver that receives, from the terminal apparatus, a plurality of images, which are candidates for an image to be posted on the first website, and first scope of disclosure specified by a first user as scope within which the image to be posted on the first website is disclosed and that receives, from a second server apparatus, which provides a second website, an image posted on the second website and second scope of disclosure within which the image is disclosed, an information generator that, if the first scope of disclosure is included in the second scope of disclosure, selects, from among the plurality of images, an image captured at the same angle as a capture angle of the image posted on the second website or an image captured at an angle at which content of the image is recognized more easily than the image posted on the second website and that generates webpage information with which the selected image is displayed at a position closer to the center of a screen than positions of other images are or displayed in a mode different from a mode in which the other images are displayed, and an information transmitter that transmits the webpage information to the terminal apparatus.

If the first scope of disclosure is included in the second scope of disclosure, it can be determined that the first user desires to disclose, to a user included in the first scope of disclosure, the same image as, or an image whose content can be recognized more easily than, the posted image disclosed to a user included in the second scope of disclosure.

By configuring the server apparatus in this manner, if the first scope of disclosure is included in the second scope of disclosure, webpage information can be generated with which an image captured at the same angle as a capture angle of the image posted by the first user on the second website or an image captured at an angle at which content of the image is recognized more easily than the image posted by the first user on the second website is prominently displayed among the plurality of images, which are candidates for the image to be posted on the first website.

In the server apparatus in the present disclosure, the information receiver receives, from the terminal apparatus, a plurality of images of the first user's head captured at different angles as images to be posted on the first website and the first scope of disclosure and that receives, from the second server apparatus, which provides the second website, the image of the first user's head posted on the second website and the second scope of disclosure, which is the scope within which the image of the first user's head is disclosed. If the first scope of disclosure is included in the second scope of disclosure, the information generator selects, from among the plurality of images of the first user's head, an image captured at the same angle as a capture angle of the image of the first user's head posted on the second website or an image captured at an angle at which content of the image is recognized more easily than the image of the first user's head posted on the second website and that generates webpage information with which the selected image of the first user's head is displayed at a position closer to the center of the screen than positions of other images of the first user's head are or displayed in a mode different from a mode in which the other images of the first user's head are displayed.

If the first scope of disclosure is included in the second scope of disclosure, it can be determined that the first user desires to disclose, to a user included in the first scope of disclosure, the same image as, or an image whose content can be recognized more easily (an image in which the first user can be recognized more easily) than, the posted image disclosed to a user included in the second scope of disclosure.

By configuring the server apparatus in this manner, if the first scope of disclosure is included in the second scope of disclosure, webpage information can be generated with which an image captured at the same angle as a capture angle of the image posted by the first user on the second website or an image captured at an angle at which content of the image is recognized more easily than the image posted by the first user on the second website is prominently displayed among the plurality of images of the first user's head, which are candidates for the image to be posted on the first website.

In the server apparatus in the present disclosure, the information receiver receives, from the terminal apparatus, a plurality of images of the first user's head captured at different angles as images to be posted on the first website and the first scope of disclosure and that receives, from the second server apparatus, which provides the second website, the image of the first user's head posted on the second website and the second scope of disclosure, which is the scope within which the image of the first user's head is disclosed. If the first scope of disclosure is wider than the second scope of disclosure, the information generator selects, from among the plurality of images of the first user's head, an image captured at an angle at which content of the image is harder to recognize than the image of the first user's head posted on the second website and that generates webpage information with which the selected image of the first user's head is displayed at a position closer to the center of the screen than positions of other images of the first user's head are or displayed in a mode different from a mode in which the other images of the first user's head are displayed.

If the first scope of disclosure is wider than the second scope of disclosure, it can be determined that the first user desires to disclose, to a user included in the first scope of disclosure, information (an image in which the first user is harder to recognize) less than information (the image of the first user) disclosed to a user included in the second scope of disclosure.

Therefore, if the first scope of disclosure is wider than the second scope of disclosure, webpage information can be generated with which an image captured at an angle at which the first user's face is harder to recognize than the image of the first user's head posted on the second website is prominently displayed among the plurality of images of the first user's head captured at different angles as images to be posted on the first website.

In the server apparatus in the present disclosure, at least one of the information receiver, and the information generator, and information transmitter includes a processor.

The method for supporting posting of information in the present disclosure is a method for supporting posting of information used by an information posting support system that provides a first website for a terminal apparatus. A computer of the information posting support system performing the method including: receiving, from the terminal apparatus, a plurality of images, which are candidates for an image to be posted on the first website, and first scope of disclosure specified by a first user as scope within which the image to be posted on the first website is disclosed; receiving, from a second server apparatus, which provides a second website, an image posted on the second website and second scope of disclosure, which is scope within which the image is disclosed; if the first scope of disclosure is included in the second scope of disclosure, selecting, from among the plurality of images, an image captured at the same angle as a capture angle of the image posted on the second website or an image captured at an angle at which content of the image is recognized more easily than the image posted on the second website; generating webpage information with which the image selected in the selection process is displayed at a position closer to the center of a screen than positions of other images are or displayed in a mode different from a mode in which the other images are displayed; and transmitting the webpage information to the terminal apparatus.

If the first scope of disclosure is included in the second scope of disclosure, it can be determined that the first user desires to disclose, to a user included in the first scope of disclosure, the same image as, or an image whose content can be recognized more easily than, the posted image disclosed to a user included in the second scope of disclosure.

By configuring the method in this manner, if the first scope of disclosure is included in the second scope of disclosure, it becomes possible to cause the terminal apparatus to prominently display an image captured at the same angle as a capture angle of the image posted by the first user on the second website or an image captured at an angle at which content of the image is recognized more easily than the image posted by the first user on the second website among the plurality of images, which are candidates for the image to be posted on the first website.

In the method in the present disclosure, in the reception of the plural images and the first scope of disclosure from the terminal apparatus, a plurality of images of the first user's head captured at different angles as images to be posted on the first website and the first scope of disclosure are received from the terminal apparatus. In the reception of the image posted on the second website and the second scope of disclosure from the second server apparatus, the image of the first user's head posted on the second website and the second scope of disclosure, which is the scope within which the image of the first user's head is disclosed, are received from the second server apparatus, which provides the second website. In the selection, if the first scope of disclosure is included in the second scope of disclosure, an image captured at the same angle as a capture angle of the image of the first user's head posted on the second website or an image captured at an angle at which content of the image is recognized more easily than the image of the first user's head posted on the second website is selected from among the plurality of images of the first user's head. In the generation, webpage information with which the selected image of the first user's head is displayed at a position closer to the center of the screen than positions of other images of the first user's head are or displayed in a mode different from a mode in which the other images of the first user's head are displayed is generated.

If the first scope of disclosure is included in the second scope of disclosure, it can be determined that the first user desires to disclose, to a user included in the first scope of disclosure, the same image as, or an image whose content can be recognized more easily (an image in which the first user can be recognized more easily) than, the posted image disclosed to a user included in the second scope of disclosure.

By configuring the method in this manner, if the first scope of disclosure is included in the second scope of disclosure, it becomes possible to cause the terminal apparatus to prominently display an image captured at the same angle as a capture angle of the image posted by the first user on the second website or an image captured at an angle at which content of the image is recognized more easily than the image posted by the first user on the second website among the plurality of images of the first user's head, which are candidates for the image to be posted on the first website.

In the method in the present disclosure, in the reception of the plural images and the first scope of disclosure from the terminal apparatus, a plurality of images of the first user's head captured at different angles as images to be posted on the first website and the first scope of disclosure are received from the terminal apparatus. In the reception of the image posted on the second website and the second scope of disclosure from the second server apparatus, the image of the first user's head posted on the second website and the second scope of disclosure, which is the scope within which the image of the first user's head is disclosed, are received from the second server apparatus, which provides the second website. In the selection, if the first scope of disclosure is wider than the second scope of disclosure, an image captured at an angle at which content of the image is harder to recognize than the image of the first user's head posted on the second website is selected from among the plurality of images of the first user's head. In the generation, webpage information with which the selected image of the first user's head is displayed at a position closer to the center of the screen than positions of other images of the first user's head are or displayed in a mode different from a mode in which the other images of the first user's head are displayed is generated.

If the first scope of disclosure is wider than the second scope of disclosure, it can be determined that the first user desires to disclose, to a user included in the first scope of disclosure, information (an image in which the first user is harder to recognize) less than information (the image of the first user) disclosed to a user included in the second scope of disclosure.

Therefore, if the first scope of disclosure is wider than the second scope of disclosure, it is possible to cause the terminal apparatus to prominently display, among the plurality of images of the first user's head captured at different angles as images to be posted on the first website, an image captured at an angle at which the first user's face is harder to recognize than the image of the first user's head posted on the second website.

In the method in the present disclosure, at least one of the reception of the a plurality of images and the first scope of disclosure, the reception of the image and the second scope of disclosure, the selection, the generation and the transmission is performed by a processor.

The non-transitory tangible recording medium in the present disclosure is a computer-readable non-transitory recording medium storing a computer program for causing a computer that provides a first website for a terminal apparatus to execute: receiving, from the server apparatus, a plurality of images, which are candidates for an image to be posted on the first website, and first scope of disclosure specified by a user as scope within which the image to be posted on the first website is disclosed; receiving, from a second server apparatus, which provides a second website, an image posted on the second website and second scope of disclosure, which is scope within which the image is disclosed; if the first scope of disclosure is included in the second scope of disclosure, selecting, from among the plurality of images, an image captured at the same angle as a capture angle of the image posted on the second website or an image captured at an angle at which content of the image is recognized more easily than the image posted on the second website; generating webpage information with which the image selected in the selection process is displayed at a position closer to the center of a screen than positions of other images are or displayed in a mode different from a mode in which the other images are displayed; and transmitting the webpage information to the terminal apparatus.

If the first scope of disclosure is included in the second scope of disclosure, it can be determined that the user desires to disclose, to a user included in the first scope of disclosure, the same image as, or an image whose content can be recognized more easily than, the posted image disclosed to a user included in the second scope of disclosure.

By configuring the non-transitory recording medium in this manner, if the first scope of disclosure is included in the second scope of disclosure, it becomes possible to cause the terminal apparatus to prominently display an image captured at the same angle as a capture angle of the image posted by the user on the second website or an image captured at an angle at which content of the image is recognized more easily than the image posted by the user on the second website among the plurality of images, which are candidates for the image to be posted on the first website.

In the non-transitory tangible recording medium in the present disclosure, in the reception of the plural images and the first scope of disclosure from the terminal apparatus, a plurality of images of the user's head captured at different angles as images to be posted on the first website and the first scope of disclosure are received from the terminal apparatus. In the reception of the image posted on the second website and the second scope of disclosure from the second server apparatus, the image posted on the second website and the second scope of disclosure, which is the scope within which the image is disclosed, are received from the second server apparatus, which provides the second website. In the selection, if the first scope of disclosure is included in the second scope of disclosure, an image captured at the same angle as a capture angle of the image of the user's head posted on the second website or an image captured at an angle at which content of the image is recognized more easily than the image of the user's head posted on the second website is selected from among the plurality of images of the user's head. In the generation, webpage information with which the selected image of the user's head is displayed at a position closer to the center of the screen than positions of other images of the user's head are or displayed in a mode different from a mode in which the other images of the user's head are displayed is generated.

If the first scope of disclosure is included in the second scope of disclosure, it can be determined that the user desires to disclose, to a user included in the first scope of disclosure, the same image as, or an image whose content can be recognized more easily (an image in which the user can be recognized more easily) than, the posted image disclosed to a user included in the second scope of disclosure.

By configuring the non-transitory recording medium in this manner, if the first scope of disclosure is included in the second scope of disclosure, it becomes possible to cause the terminal apparatus to prominently display an image captured at the same angle as a capture angle of the image posted by the user on the second website or an image captured at an angle at which content of the image is recognized more easily than the image posted by the user on the second website among the plurality of images of the user's head, which are candidates for the image to be posted on the first website.

In the non-transitory tangible recording medium in the present disclosure, in the reception of the plural images and the first scope of disclosure from the terminal apparatus, a plurality of images of the user's head captured at different angles as images to be posted on the first website and the first scope of disclosure are received from the terminal apparatus. In the reception of the image posted on the second website and the second scope of disclosure from the second server apparatus, the image posted on the second website and the second scope of disclosure, which is the scope within which the image of the user's head is disclosed, are received from the second server apparatus, which provides the second website. In the selection, if the first scope of disclosure is wider than the second scope of disclosure, an image captured at an angle at which content of the image is harder to recognize than the image of the user's head posted on the second website is selected from among the plurality of images of the user's head. In the generation, webpage information with which the selected image of the user's head is displayed at a position closer to the center of the screen than positions of other images of the user's head are or displayed in a mode different from a mode in which the other images of the user's head are displayed is generated.

If the first scope of disclosure is wider than the second scope of disclosure, it can be determined that the user desires to disclose, to a user included in the first scope of disclosure, information (an image in which the user is harder to recognize) less than information (the image of the user) disclosed to a user included in the second scope of disclosure.

Therefore, if the first scope of disclosure is wider than the second scope of disclosure, it is possible to cause the terminal apparatus to prominently display, among the plurality of images of the user's head captured at different angles as images to be posted on the first website, an image captured at an angle at which the user's face is harder to recognize than the image of the user's head posted on the second website.

The embodiments of the present disclosure will be described in detail hereinafter with reference to the drawings.

The embodiments that will be described hereinafter are specific examples of the present disclosure. Values, shapes, components, steps, order of the steps, and the like that will be mentioned in the embodiments are examples and not intended to limit the present disclosure. In addition, among the components described in the embodiments, components that are not described in independent claims, which indicate the broadest concepts, will be described as arbitrary components. The embodiments may be combined with one another.

Overview of Service to be Provided

Figure 1B:
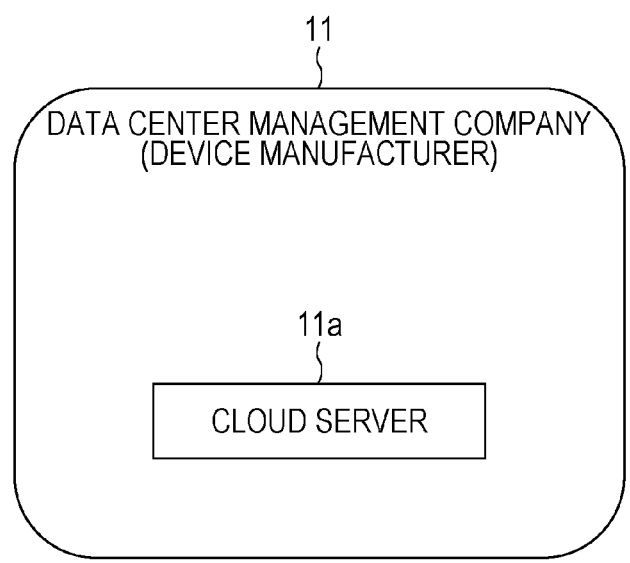
FIG. 1B is a diagram illustrating an example of the relationship between a data center management company and a device manufacturer in an information posting support system according to embodiments of the present disclosure.
Figure 1C:
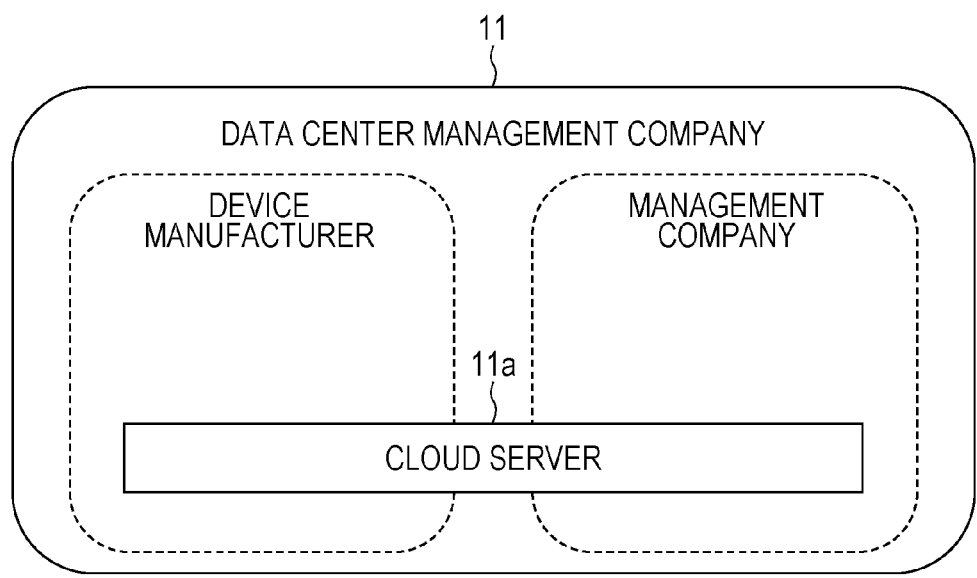
FIG. 1C is a diagram illustrating an example of the relationship between a data center management company, a device manufacturer, and a management company in an information posting support system according to embodiments of the present disclosure.

FIGS. 1A to 1C are diagrams illustrating the overview of an information posting support system according to first and second embodiments. FIG. 1A illustrates the overview of the information posting support system according to the first and second embodiments.

A group 10 is, for example, a company, an organization, a home, or the like and may be of any magnitude. An example of the group 10 is a hair salon. The group 10 includes a plurality of devices 10a (for example, each of the plurality of devices 10a is a device 100, which will be described later), namely Device A and Device B, and a home gateway 10b.

The plurality of devices 10a are devices (for example, smartphones, tablets, personal computers (PCs), television sets, or the like) capable of connecting to the Internet. The plurality of devices 10a, however, may be devices not capable of directly connecting to the Internet, insofar as the plurality of devices 10a can be connected to the Internet through the home gateway 10b. The group 10 includes users 1 who use the plurality of devices 10a. The users 1 are, for example, employees and customers of the hair salon.

A data center management company 11 includes a cloud server 11a. The cloud server 11a is a virtual server that cooperates with various devices through the Internet. The data center management company 11 controls, for example, data and the cloud server 11a and manages a data center that controls the data and the cloud server 11a. The role of the data center management company 11 will be described in detail later.

Here, the data center management company 11 is not limited to a company that only manages the data and the cloud server 11a. For example, when a device manufacturer that develops and manufactures one of the plurality of devices 10a also controls the data and the cloud server 11a, the device manufacturer corresponds to the data center management company 11 (refer to FIG. 1B).

In addition, the data center management company 11 is not limited to a single company. For example, when a device manufacturer and another management company jointly or separately manage the data and the cloud server 11a, either or both of them correspond to the data center management company 11 (refer to FIG. 1C).

A service provider 12 holds a server 12a (for example, a server apparatus 200, which will be described later).

In this service, the home gateway 10b is not mandatory. For example, if the cloud server 11a controls all the data, the home gateway 10b is not necessary. In addition, as in a case in which all the devices 10a in the group 10 are connected to the Internet, there might be no device that is not capable of directly connecting to the Internet.

Next, how information moves in the service will be described. First, Device A or Device B in the group 10 transmits registration information (for example, preliminary registration information and first to fourth registration information, which will be described later) to the cloud server 11a of the data center management company 11. The cloud server 11a accumulates the registration information regarding Device A or Device B (indicated by (a) in FIG. 1A).

The registration information might be directly provided for the cloud server 11a from the plurality of devices 10a through the Internet. Alternatively, the registration information transmitted from the plurality of devices 10a may be accumulated in the home gateway 10b and then provided for the cloud server 11a.

Next, the cloud server 11a of the data center management company 11 provides a certain amount of accumulated registration information for the service provider 12 at a time. Here, the certain amount may be an amount that can be provided by the data center management company 11 after the data center management company 11 sorts out the registration information, or may be an amount determined by the service provider 12. The certain amount need not necessarily be a constant value, but may vary depending on the situation.

The server 12a held by the service provider 12 saves the registration information as necessary (indicated by (b) in FIG. 1A). The service provider 12 then rearranges the registration information to obtain presentation information (for example, first to third presentation information, which will be described later) that suits a service to be provided for a user and provides the presentation information for the user. The user may be one of the users 1 who use the plurality of devices 10a or one of users 2 outside the group 10.

For example, the service may be directly provided for the user from the service provider 12 (indicated by (f) and (e) in FIG. 1A). Alternatively, for example, the service may be provided for the user again through the cloud server 11a of the data center management company 11 (indicated by (c) and (d) in FIG. 1A). The cloud server 11a of the data center management company 11 may rearrange the registration information to obtain information that suits the service to be provided for the user and provide the information for the service provider 12.

The users 1 and the users 2 may be different or may be the same.

Configurations According to First Embodiment

FIG. 2 is a block diagram illustrating an example of the configuration of the information posting support system according to the first embodiment of the present disclosure. As illustrated in FIG. 2, the information posting support system includes the device 100 (an example of the terminal apparatus in the present disclosure), Social Networking Service (SNS) server apparatus 200a, and a server apparatus 200 (an example of the server apparatus in the present disclosure).

In FIG. 2, the device 100, a SNS server apparatus 200a, and the server apparatus 200 are connected to each other through a network 300. The network 300 may be a wireless network, a wired network, or a network including both a wireless network and a wired network.

Although only one device 100 is illustrated in FIG. 2, two or more devices 100 may be included.

First, the configuration of the device 100 will be described.

The device 100 is an information processing apparatus that uses an information posting service provided by the server apparatus 200 and is, for example, a smartphone, a tablet, a PC, a television set, or the like. The tablet may be a large-screen tablet (for example, a 4K tablet) used in the hair salon for business purposes. The use of the information posting service refers to browsing of a hairstyle evaluation website and posting of information on the hairstyle evaluation website.

The hairstyle evaluation website is a website (first website) in which word-of-mouth information is collected and disclosed using hairstyles of users, stylists who arranged the hairstyles, hair salons to which the stylists belong, and the like as evaluation targets. Because, in this hairstyle evaluation website, a third party who has not gone to any of the hair salons can evaluate other people's contributions (for example, images of the hairstyles), posted content (for example, posted images, posted comments, and the like) can be richer than in a restaurant evaluation website or a product evaluation website, in which a user needs to actually use a restaurant or a product to make an evaluation, which is advantageous.

The device 100 includes an input unit 101, a notification unit 102, a storage unit 103, an information transmission/reception unit 104, and an information processing unit 105.

The input unit 101 is an input device such as a button or a touch panel.

The notification unit 102 includes a display device such as a display and an output device such as a speaker.

The storage unit 103 is storage device such as a memory or a hard disk device.

For example, the storage unit 103 stores an identifier (ID; hereinafter referred to as a "user ID") of a user (first user) of the device 100. The user ID is transmitted to the server apparatus 200 along with a hairstyle image as part of the first registration information and stored in a storage unit 203. The hairstyle image is, for example, a photograph of the user's head including the hairstyle captured at a certain angle.

In addition, for example, the storage unit 103 stores presentation information received from the server apparatus 200. The presentation information is, for example, a webpage (also referred to as "webpage information") included in the hairstyle evaluation website. The presentation information is image information included in a webpage for supporting posting of an image by the user. The presentation information is displayed on the display, which is included in the notification unit 102. Display examples will be described later with reference to FIGS. 5 to 6B.

The information transmission/reception unit 104 is a communication interface unit that transmits information to another apparatus and that receives information transmitted from another apparatus.

For example, the information transmission/reception unit 104 transmits registration information to the server apparatus 200. The registration information is information necessary to use the information posting service. Details of the registration information will be described in detail later with reference to FIG. 3.

In addition, for example, the information transmission/reception unit 104 receives presentation information from the server apparatus 200.

The information processing unit 105 is a control device that executes various types of information processing, such as a processor.

For example, the information processing unit 105 causes the information transmission/reception unit 104 to transmit a hairstyle image obtained from a certain apparatus (for example, a camera used in the hair salon) to the server apparatus 200 as the first registration information.

In addition, for example, the information processing unit 105 stores first presentation information or second presentation information received from the server apparatus 200 in the storage unit 103. The information processing unit 105 then reads the first presentation information or the second presentation information from the storage unit 103 and causes the notification unit 102 to display the first presentation information or the second presentation information. The first presentation information is image information included in webpage information that enables the user to specify (select) scope of disclosure of a hairstyle image to be posted (refer to FIG. 5). The second presentation information is image information included in a webpage (first webpage information) that enables the user to specify (select) a hairstyle image to be posted (refer to FIGS. 6A and 6B).

In addition, for example, if, after the first presentation information is presented, the information processing unit 105 receives specification of scope of disclosure of a hairstyle image to be posted, the information processing unit 105 causes the information transmission/reception unit 104 to transmit the scope of disclosure to the server apparatus 200 as the second registration information. For the scope of disclosure, for example, a plurality of categories such as "public (all users)", "close friends", and "acquaintances" are prepared.

In addition, for example, if, after the second presentation information is presented, the information processing unit 105 receives specification of a hairstyle image to be posted (hereinafter referred to as an "image to be posted") and a comment (hereinafter referred to as a "comment to be posted") on the hairstyle image, the information processing unit 105 causes the information transmission/reception unit 104 to transmit the image to be posted, the comment to be posted, and a posting time to the server apparatus 200 as the third registration information. The comment to be posted is a comment made by the user who posts the image and includes, for example, a thought on the hairstyle, the arrangement, the stylist, the hair salon, or the like. The posting time refers to a time (year, month, date, and time) at which the image and the comment have been posted.

The configuration of the device 100 has been described.

Next, the configuration of the server apparatus 200 will be described.

The server apparatus 200 is an information processing apparatus that provides the information posting service for the device 100.

The server apparatus 200 includes an information transmission/reception unit 201, an information registration unit 202, the storage unit 203, and an information generation unit 204.

The information transmission/reception unit 201 is a communication interface unit that transmits information to another apparatus and that receives information transmitted from another apparatus.

For example, the information transmission/reception unit 201 receives registration information transmitted from the device 100.

In addition, for example, the information transmission/reception unit 201 transmits presentation information to the device 100.

The information registration unit 202 is a control device, such as a processor, that registers the registration information received by the information transmission/reception unit 201 to the storage unit 203.

For example, after registering registration information to the storage unit 203, the information registration unit 202 notifies the information generation unit 204 of the registration.

The storage unit 203 is a storage device such as a memory or a hard disk device.

The storage unit 203 stores the registration information registered by the information registration unit 202 while associating the registration information with other pieces of information using a data table.

Now, the data table will be described with reference to FIG. 3. FIG. 3 illustrates an example of the data table stored in the storage unit 203.

As illustrated in FIG. 3, the data table includes fields a to e. The field a includes the preliminary registration information, the field b includes the first registration information, the field c includes the second registration information, the field d includes the third registration information, and the field e includes the fourth registration information.

The preliminary registration information included in the field a includes information such as user IDs, close friend IDs, and acquaintance IDs. Each user ID is an ID of a user who uses a device and who can use the information posting service with using the device. For example, a user corresponding to one of the user IDs uses the device 100. And another user corresponding to another one of the user IDs uses another device (not illustrated). Alternatively, plural users may use the device 100. In addition, the user indicated by each user ID is a user (poster) who posts images and comments. Each close friend ID is an ID of a user registered by a user of a corresponding user ID as a close friend. Each acquaintance ID is an ID of a user registered by a user of a corresponding user ID as an acquaintance. Close friends and acquaintances are categories of the scope of disclosure. Therefore, the amount of information (that is, posted images and comments) posted by a user indicated by a user ID disclosed is different between close friends and acquaintances. For example, close friends are included in a smaller scope of disclosure than acquaintances (the amount of information disclosed to close friends is larger than that disclosed to acquaintances). In the example illustrated in FIG. 3, two close friend IDs and three acquaintance IDs are registered, but any number of IDs may be registered.

The preliminary registration information described above is, for example, input by a user using the input unit 101 of the device 100 before the user posts images and comments.

The preliminary registration information is then transmitted to the server apparatus 200 from the device 100 and, as illustrated in FIG. 3, registered to the storage unit 203.

The first registration information included in the field b includes information such as salon IDs, stylist IDs, and hairstyle images. Each salon ID is an ID of a hair salon (may be the name of the hair salon) used by a user indicated by a corresponding user ID. Each stylist ID is an ID of a stylist (may be the name of the stylist) who belongs to a corresponding hair salon ID and who arranged (cut a user's hair) a hairstyle of a user indicated by a corresponding user ID. Each hairstyle image is, as described above, an image indicating a hairstyle of a user indicated by a corresponding user ID after the arrangement.

A hairstyle image is, for example, a photograph captured by a camera, which is provided in a hair salon. The camera, for example, captures an image of a user's head at an arbitrary angle. In this embodiment, for example, a plurality of hairstyle images captured at a plurality of angles, such as a front, 45 degrees on the right, 45 degrees on the left, a right side, a left side, and a back, are registered. The angle of the hairstyle image is identified by the information generation unit 204, which will be described later. Although the data format of a hairstyle image is Joint Photographic Experts Group (JPEG) in the example illustrated in FIG. 3, the data format is not limited to this.

The second registration information included in the field c includes information regarding the scope of disclosure. The scope of disclosure is scope within which an image and a comment posted by a user indicated by a corresponding user ID are disclosed. The scope of disclosure includes, for example, categories such as "public (all users)", "acquaintances", "close friends", and "myself". The scope of disclosure becomes narrower in the following order: "public", "acquaintances", "close friends", and "myself".

In other words, the amount of information disclosed becomes larger in the following order: "public", "acquaintances", "close friends", and "myself".

In addition to these four categories, categories such as "all of registered salons" and "only this salon" may be added. The category "all of registered salons" refers to all hair salons whose IDs have been registered to the storage unit 103 (that is, all hair salons where the information posting service can be used) separately from the data table illustrated in FIG. 3. The category "only this salon" refers to a hair salon indicated by a salon ID illustrated in FIG. 3 (that is, a hair salon that arranged a hairstyle of a user indicated by a corresponding user ID). Therefore, the scope of disclosure is smaller in "only this salon" than in "all of registered salons". One of these two categories may be specified (selected) separately from the above-described four categories. For example, both "only this salon" and "close friends" may be selected.

The third registration information included in the field d includes information such as posted images, posted comments, and posting times. Each posted image is an image selected by a user indicated by a corresponding user ID from the hairstyle images included in the field b as an image to be posted. Although only one posted image is registered in the example illustrated in FIG. 3, a plurality of images captured at different angles may be registered. Each posted comment is, for example, text data indicating a comment on a corresponding posted image input by a user indicated by a corresponding user ID. Although the data format of a text is HyperText Markup Language (HTML) in the example illustrated in FIG. 3, the data format is not limited to this. Each posting time is information indicating a time at which a corresponding posted image and a corresponding posted comment have been posted.

The fourth registration information included in the field e includes information such as others' comments and evaluations. Each of the others' comments is, for example, text data indicating a comment, posted by a user other than the poster, on a corresponding posted image and a corresponding posted comment. Each of the others' comments includes, for example, a thought on the hairstyle, the hair salon, or the stylist or a question to the user who has posted the corresponding image and comment. Each evaluation is a value indicating the number of times that a simple posting operation has been performed. The simple posting operation is a simple operation (for example, an operation performed on an evaluation input button 33 illustrated in FIG. 13) performed by a user other than the poster in order to express his/her fondness for a corresponding posted image and comment. In the example illustrated in FIG. 3, "–" is registered as "others' comments" and "0" is registered as "evaluation" as default values.

The fourth registration information is used in the second embodiment, which will be described later, and accordingly details of use thereof will be described later.

Various pieces of registration information included in the fields a to e are input as necessary by the user (first user) of the device 100 and transmitted to the server apparatus 200 from the device 100. At this time, the registration information is transmitted to the server apparatus 200 along with the user ID. The registration information is then stored in (registered to) the storage unit 203 as illustrated in FIG. 3.

The data table stored in the storage unit 203 in this manner is used by the information generation unit 204 to generate the second presentation information.

An example of the data table stored in the storage unit 203 has been described.

The storage unit 203 also stores template data (image information for configuring webpages) regarding the first presentation information and the second presentation information.

The information generation unit 204 is a control device, such as a processor, that reads and generates presentation information to be transmitted to the device 100.

For example, the information generation unit 204 receives, from the information registration unit 202, a notification indicating that the first registration information has been registered to the storage unit 203, and then reads the template data regarding the first presentation information from the storage unit 203. The information generation unit 204 causes the information transmission/reception unit 201 to transmit the template data to the device 100.

In addition, for example, the information generation unit 204 receives, from the information registration unit 202, a notification indicating that the second registration information has been registered to the storage unit 203, and then reads, from the storage unit 203, the template data regarding the second presentation information, a user ID, a plurality of hairstyle images, and scope of disclosure. The information generation unit 204 causes the information transmission/reception unit 201 to transmit the read user ID to a SNS server apparatus 200a. The information generation unit 204 obtains, from the SNS server apparatus 200a, disclosed information corresponding to the user ID via the information transmission/reception unit 201. The disclosed information is an image of a user (image of the user's head) that has been posted on an SNS website (second website) provided by the SNS server apparatus 200a and that is used (disclosed) in the SNS website and scope of disclosure of the image. The disclosed information is used for automatically determining a hairstyle image to be recommended to the user, details of which will be described later. The information generation unit 204 then generates the second presentation information on the basis of the template data regarding the second presentation information, the obtained disclosed information, the read plurality of hairstyle images, and the scope of disclosure. Details of the generation process will be described later. The information generation unit 204 then causes the information transmission/reception unit 201 to transmit the generated second presentation information to the device 100.

The SNS server apparatus 200*a* includes, for example, at least an information transmission/reception unit that receives a user ID from the server apparatus 200, a storage unit that stores disclosed information corresponding to the user ID, and a control unit. For example, the control unit obtains, from the storage unit, disclosed information corresponding to a user ID received by the information transmission/reception unit. For example, the control unit transmits the disclosed information corresponding to the user ID obtained from the storage unit to the information transmission/reception unit. For example, the information transmission/reception unit transmits the disclosed information corresponding to the user ID to the server apparatus 200. By configuring the SNS server apparatus 200*a* in this manner, the SNS server apparatus 200*a* can receive a user ID from the server apparatus 200 and then transmit disclosed information corresponding to the received user ID to the server apparatus 200.

Although the server apparatus 200 obtains disclosed information corresponding to a user ID from the SNS server apparatus 200*a* in the above-described example, the SNS server apparatus 200*a* need not necessarily be used. For example, a server apparatus (not illustrated) that controls disclosed information corresponding to a user ID and that transmits the disclosed information corresponding to the received user ID to the server apparatus 200, after receiving a user ID from the server apparatus 200, may be used instead of the SNS server apparatus 200*a*.

The configuration of the server apparatus 200 has been described.

Operations According to First Embodiment

Figure 4:
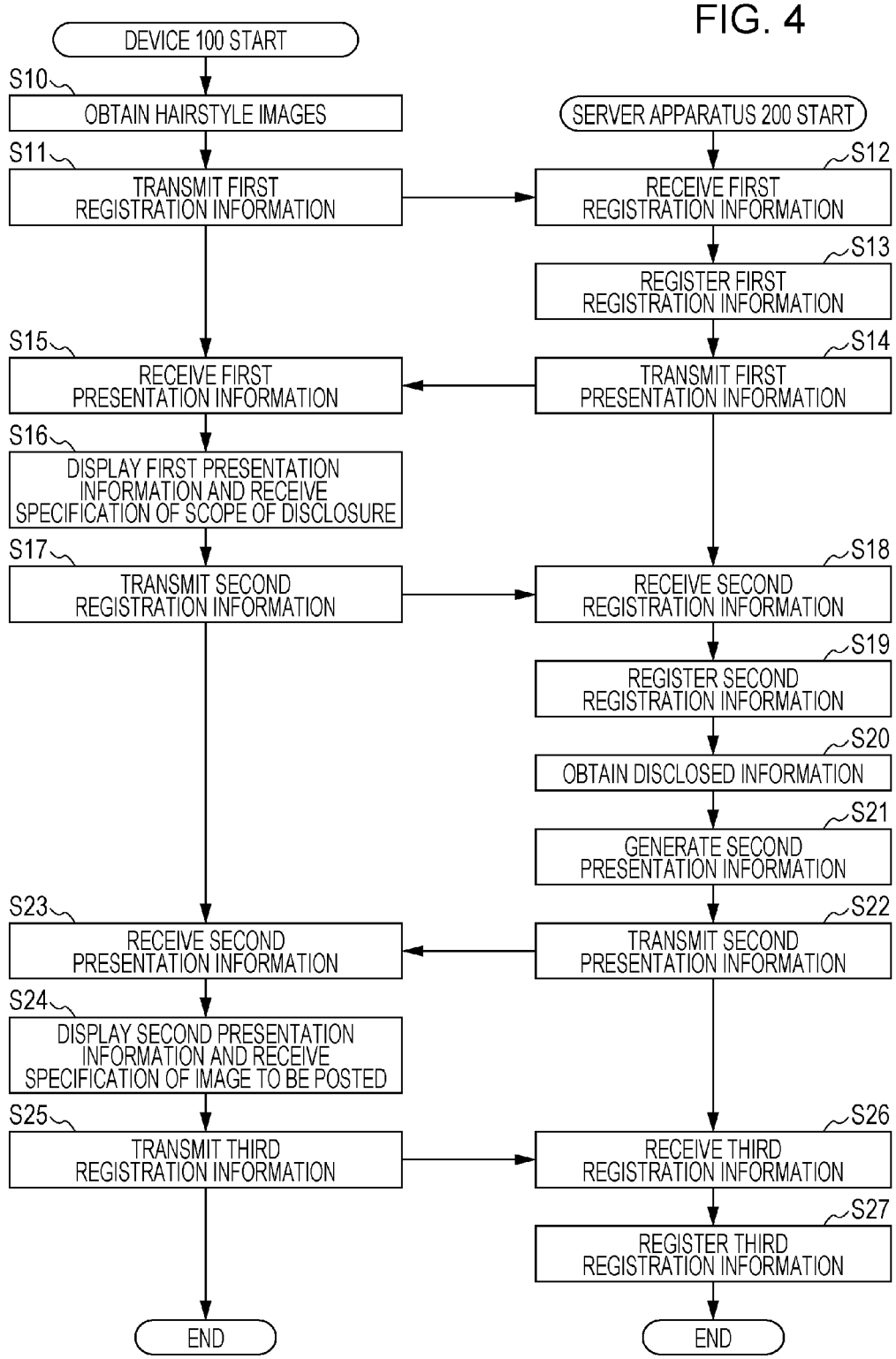
FIG. 4 is a flowchart illustrating an example of a procedure of a process for supporting posting of information performed by the information posting support system according to the first embodiment of the present disclosure.

Next, an example of a procedure of a process for supporting posting of information performed by the information posting support system (the device 100 and the server apparatus 200) according to this embodiment will be described. FIG. 4 is a flowchart illustrating an example of the procedure of the process for supporting posting of information performed by the information posting support system according to this embodiment.

In step S10, the information transmission/reception unit 104 of the device 100 obtains hairstyle images from a certain apparatus.

For example, the information transmission/reception unit 104 directly receives a plurality of hairstyle images captured by cameras provided in hair salons through wireless communication or wired communication or indirectly receives the plurality of hairstyle images through a relay apparatus (for example, a wireless local area network (LAN) router) connected to the cameras provided in the hair salons. The plurality of hairstyle images are provided with salon IDs and stylist IDs. The salon IDs and the stylist ID are, for example, added to the hairstyle images by the cameras that capture the hairstyle images or the relay apparatus that communicates with the cameras. The information processing unit 105 stores the plurality of hairstyle images received by the information transmission/reception unit 104 in the storage unit 103.

In step S11, the information processing unit 105 causes the information transmission/reception unit 104 to transmit the first registration information to the server apparatus 200.

For example, the information processing unit 105 reads a user ID and a plurality of hairstyle images from the storage unit 103. The information processing unit 105 then determines the plurality of hairstyle images and the salon IDs and the stylist IDs added to the hairstyle images as the first registration information and adds the user ID to the first registration information. The information processing unit 105 then causes the information transmission/reception unit 104 to transmit the first registration information, adding the user ID, to the server apparatus 200. Although the user ID added to the first registration information is stored in the storage unit 103 here, the user ID may be input using the input unit 101 when the first registration information is transmitted.

In step S12, the information transmission/reception unit 201 of the server apparatus 200 receives the first registration information transmitted from the device 100.

In step S13, the information registration unit 202 registers the first registration information received by the information transmission/reception unit 201 to the storage unit 203.

For example, assume that in FIG. 3, the preliminary registration information (refer to the field a) is registered in advance. The information registration unit 202 registers the first registration information while associating the first registration information with a user ID included in the preliminary registration information (refer to the field b). Thereafter, the information registration unit 202 outputs, to the information generation unit 204, information (hereinafter referred to as "first registration completion information") indicating that the first registration information has been registered.

In step S14, the information generation unit 204 causes the information transmission/reception unit 201 to transmit the first presentation information to the device 100.

For example, upon receiving the first registration completion information from the information registration unit 202, the information generation unit 204 reads the template data (hereinafter referred to as the "first presentation information") regarding the first presentation information from the storage unit 203. The information generation unit 204 then causes the information transmission/reception unit 201 to transmit the read first presentation information to the device 100.

In step S15, the information transmission/reception unit 104 of the device 100 receives the first presentation information transmitted from the server apparatus 200. The information processing unit 105 stores the first presentation information received by the information transmission/reception unit 104 in the storage unit 103.

In step S16, the information processing unit 105 reads the first presentation information from the storage unit 103 and causes the notification unit 102 to display the first presentation information, in order to receive specification of the scope of disclosure.

Now, an example of the displayed first presentation information in the device 100 will be described. FIG. 5 illustrates an example of the displayed first presentation information.

As illustrated in FIG. 5, a message for asking the user to select the scope of disclosure is displayed at a top of a screen. Six categories (public, close friends, acquaintances, myself, all of registered salons, and only this salon) of the scope of disclosure are displayed under the message as options. The user sees the screen and performs an operation for specifying a desired category of the scope of disclosure using the input unit 101. Upon receiving the specification of a category of the scope of disclosure, the information processing unit 105 stores the specified category in the storage unit 103.

In step S17, the information processing unit 105 causes the information transmission/reception unit 104 to transmit the second registration information to the server apparatus 200.

For example, the information processing unit 105 reads a user ID and the specified category of the scope of disclosure from the storage unit 103. The information processing unit 105 then determines the specified category of the scope of disclosure as the second registration information and adds the user ID to the second registration information. The information processing unit 105 causes the information transmission/reception unit 104 to transmit the second registration information, adding the user ID, to the server apparatus 200. As in the transmission of the first registration information, the user ID added to the second registration information may be stored in the storage unit 103 in advance or may be input using the input unit 101 when the second registration information is transmitted.

In step S18, the information transmission/reception unit 201 of the server apparatus 200 receives the second registration information transmitted from the device 100.

In step S19, the information registration unit 202 registers the second registration information received by the information transmission/reception unit 201 to the storage unit 203.

For example, assume that in FIG. 3, the preliminary registration information (refer to the field a) and the first registration information (refer to the field b) have been registered. The information registration unit 202 registers the second registration information while associating the second registration information with a user ID included in the preliminary registration information (refer to the field c). Thereafter, the information registration unit 202 outputs, to the information generation unit 204, information (hereinafter referred to as "second registration completion information") indicating that the second registration information has been registered.

In step S20, the information generation unit 204 obtains disclosed information from the SNS server apparatus 200a via the information transmission/reception unit 201.

For example, upon receiving the second registration completion information from the information registration unit 202, the information generation unit 204 reads the template data regarding the second presentation information, the user ID, the plurality of hairstyle images, and the scope of disclosure. The information generation unit 204 then causes the information transmission/reception unit 201 to transmit the read user ID to the SNS server apparatus 200a. The SNS server apparatus 200a transmits, to the server apparatus 200, disclosed information (for example, an image of the user and the scope of disclosure of the image) associated with the same user ID as that received from the server apparatus 200. The image of the user as the disclosed information may be an image of a profile page of the user in the SNS website or an image positively evaluated by other users.

In step S21, the information generation unit 204 generates the second presentation information on the basis of the disclosure information obtained from the SNS server apparatus 200a and the plurality of hairstyle images, the scope of disclosure, and the template data for generating the second presentation information read from the storage unit 203.

Here, a specific example of a process for generating the second presentation information will be described hereinafter.

First, the information generation unit 204 analyzes the image of the user received from the SNS server apparatus 200a and identifies the capture angle of the image. The information generation unit 204 then determines whether the scope of disclosure (hereinafter referred to as a "first scope of disclosure") read from the storage unit 203 and the scope of disclosure (hereinafter referred to as a "second scope of disclosure") received from the SNS server apparatus 200a are the same (hereinafter referred to as a "first determination").

If the information generation unit 204 determines as a result of the first determination that the first scope of disclosure and the second scope of disclosure are the same, the information generation unit 204 selects a hairstyle image captured at the same capture angle as that identified as a result of the analysis from among the plurality of hairstyle images read from the storage unit 203. For example, if the first scope of disclosure is "close friends", the second scope of disclosure is "close friends", and the identified capture angle is "front", the information generation unit 204 selects a hairstyle image whose capture angle is "front".

On the other hand, if the information generation unit 204 determines as a result of the first determination that the first scope of disclosure and the second scope of disclosure are not the same, the information generation unit 204 determines whether the first scope of disclosure is wider than the second scope of disclosure (hereinafter referred to as a "second determination"). In the following description, six capture angles, namely "front", "45 degrees on the right", "45 degrees on the left", "right side", "left side", and "back", are assumed as the capture angles of the plurality of hairstyle images read from the storage unit 203. The user's face becomes harder to recognize in the following order: "front", "45 degrees on the right", "45 degrees on the left", "right side", "left side", and "back". That is, it is easiest to recognize a user's face in "front", and it is hardest to recognize a user's face in "back".

If the information generation unit 204 determines as a result of the second determination that the first scope of disclosure is wider than the second scope of disclosure, it can be determined that the user (first user) of the device 100 desires to disclose, to a user included in the first scope of disclosure, information (an image with which the first user is hard to recognize) less than information (an image of the first user) disclosed to a user included in the second scope of disclosure. Since an image is disclosed more broadly (to more users) in the first scope of disclosure than in the scope of disclosure (second scope of disclosure) of the SNS website, the information generation unit 204 selects a hairstyle image captured at an angle at which the user's face is harder to recognize (an angle different from the front) than at the identified capture angle from among the plurality of hairstyle images read from the storage unit 203. For example, if the first scope of disclosure is "public", the second scope of disclosure is "acquaintances", and the identified capture angle is "45 degrees on the right", the information generation unit 204 selects a hairstyle image whose capture angle is "right side".

On the other hand, if the information generation unit 204 determines as a result of the second determination that the first scope of disclosure is narrower than the second scope of disclosure, it can be determined that the user (first user) of the device 100 desires to disclose, to a user included in the first scope of disclosure, the same information (an image with which the first user is easy to recognize) regarding the user as, or information with which the first user is easier to recognize than, the information disclosed to a user included in the second scope of disclosure.

Since an image is disclosed less broadly (to fewer users) in the first scope of disclosure than in the scope of disclosure of the SNS website, the information generation unit 204 selects a hairstyle image captured at an angle at which the user's face is easier to recognize (an angle close to the front) than at the identified capture angle from among the plurality of hairstyle images read from the storage unit 203. For example, if the first scope of disclosure is "acquaintances", the second scope of disclosure is "public", and the identified capture angle is "45 degrees on the right", the information generation unit 204 selects a hairstyle image whose capture angle is "front".

Thus, the information generation unit 204 selects a hairstyle image on the basis of the information disclosed in the SNS website (second website).

If the information generation unit 204 determines as a result of the first determination that the first scope of disclosure is included in the second scope of disclosure, the information generation unit 204 may select a hairstyle image captured at the same angle as the identified capture angle from among the plurality of hairstyle images read from the storage unit 203. For example, if the first scope of disclosure is "close friends", the second scope of disclosure is "acquaintances", and the identified capture angle is the "front", the information generation unit 204 may select a hairstyle image whose capture angle is "front".

The information generation unit 204 then processes the read template data such that the plurality of hairstyle images read from the storage unit 203 are included. At this time, the information generation unit 204 processes the template data such that the selected hairstyle image becomes larger than the other hairstyle images and is displayed at a most prominent position (for example, at the center of the screen). The processed template data will be referred to as "second presentation information" hereinafter.

A specific example of the process for generating the second presentation information has been described.

In step S22, the information generation unit 204 causes the information transmission/reception unit 201 to transmit the second presentation information to the device 100.

In step S23, the information transmission/reception unit 104 of the device 100 receives the second presentation information transmitted from the server apparatus 200. The information processing unit 105 stores the second presentation information received by the information transmission/reception unit 104 in the storage unit 103.

In step S24, the information processing unit 105 reads the second presentation information from the storage unit 103 and causes the notification unit 102 to display the second presentation information, in order to receive specification of an image to be posted.

Now, an example of the second presentation information displayed in the device 100 will be described with reference to FIGS. 6A and 6B. FIGS. 6A and 6B illustrate examples of the displayed second presentation information.

As illustrated in FIGS. 6A and 6B, a message for asking the user to select the image to be posted is displayed at the top of the screen. The scope of disclosure specified by the user when the first presentation information has been presented is displayed next to the message. A plurality of hairstyle images are displayed under the message. Although three of six hairstyle images are displayed in FIGS. 6A and 6B as an example, the other hairstyle images can be displayed through an operation (for example, a flick operation) performed by the user.

In the example illustrated in FIG. 6A, a hairstyle image 20 captured at the angle of "right side" is displayed, at the center of the screen, larger than a hairstyle image 21 captured at the angle of "front" and a hairstyle image 22 captured at the angle of "back". In the example illustrated in FIG. 6B, the hairstyle image 21 captured at the angle of "front" is displayed, at the center of the screen, larger than the hairstyle image 20 captured at the angle of "right side" and the hairstyle image 22 captured at the angle of "back". Thus, the hairstyle image selected by the information generation unit 204 in step S21 is displayed in a mode different from one in which the other hairstyle images that have not been selected are displayed. Therefore, the hairstyle image selected by the information generation unit 204 in step S21 is prominently displayed among the other hairstyle images. That is, the hairstyle image 20 captured at the angle of "right side" illustrated in FIG. 6A and the hairstyle image 21 captured at the angle of "front" illustrated in FIG. 6B are recommended to the user as images that reflect the user's information disclosure policy in the SNS website. The hairstyle image selected by the information generation unit 204 may be displayed at the center of the screen or may be displayed in a different mode (for example, the selected hairstyle image may become larger, may be surrounded by lines (may be black lines, red lines, yellow lines, or the like), or may flash).

The user sees the screen illustrated in FIG. 6A or 6B and performs an operation for specifying a desired image to be posted using the input unit 101. At this time, the user may select the recommended hairstyle image or another hairstyle image as the image to be posted. In addition, the user may input a comment, which is not illustrated, on the selected image to be posted. For example, if the user selects the image to be posted using the input unit 101, the device 100 (the information processing unit 105) displays a comment input field on the display, which is included in the notification unit 102. As described above, the comment includes, for example, an evaluation (word-of-mouth information) on the hairstyle, the hair salon, or the stylist. Upon receiving the posted image and the posted comment, the information processing unit 105 stores the posted image and the posted comment in the storage unit 103.

In step S25, the information processing unit 105 causes the information transmission/reception unit 104 to transmit the third registration information to the server apparatus 200.

For example, the information processing unit 105 reads the user ID, the specified image, and the specified comment from the storage unit 103. At this time, the information processing unit 105 obtains information regarding a time (hereinafter referred to as a "posting time") at which the reading has been performed. The information processing unit 105 then determines the posted image, the posted comment, and the posting time as the third registration and adds a user ID to the third registration information. The information processing unit 105 causes the information transmission/reception unit 104 to transmit the third registration information, adding the user ID, to the server apparatus 200. As in the transmission of the first registration information, the user ID added to the third registration information may be stored in the storage unit 103 in advance or may be input using the input unit 101 when the third registration information is transmitted.

In step S26, the information transmission/reception unit 201 of the server apparatus 200 receives the third registration information transmitted from the device 100.

In step S27, the information registration unit 202 registers the third registration information received by the information transmission/reception unit 201 to the storage unit 203.

For example, assume that in FIG. 3, the preliminary registration information (refer to the field a), the first registration information (refer to the field b), and the second registration information (refer to the field c) have been registered. The information registration unit 202 registers the third registration information while associating the third registration information with a user ID included in the preliminary registration information (refer to the field d).

After registering the third registration information, the information registration unit 202 registers the default values of the fourth registration information (refer to the field e) as illustrated in FIG. 3. In the example illustrated in FIG. 3, "−" is registered as the "other's comments" and "0" is registered as the "evaluation" as the default values. These values indicate that no comments or evaluations have been input (unregistered) by other users for the posted image and the posted comment. Thereafter, the information registration unit 202 outputs, to the information generation unit 204, information (hereinafter referred to as "third registration completion information") indicating that the third registration information has been registered.

Upon receiving the third registration completion information, the information generation unit 204 waits until a request to display the third presentation information is received from the device 100. The third presentation information will be described in the second embodiment.

Thus, according to the information posting support system according to this embodiment, an optimal image is selected on the basis of an image of a user disclosed in an SNS website and prominently presented to the user. Thus, the user can easily select an image that suits his/her own information disclosure policy in an Internet service. As a result, privacy can be protected in accordance with the user's information disclosure policy in posting of an image on an evaluation website.

The first embodiment may be modified in various ways without deviating from the scope thereof. For example, the following modifications are possible.

For example, the user may specify a certain scope of disclosure, and then specify an image corresponding to the certain scope of disclosure and input a comment. Next, the user may specify another scope of disclosure, and then specify an image corresponding to the other scope of disclosure and input a comment. In this case, the processing in steps S14 to S27 is repeated. Thus, the user can associate an image and a comment with each of a plurality of categories of the scope of disclosure and register the images and the comments.

Although the user initially specifies scope of disclosure among the candidates illustrated in FIG. 5 in step S16 in the first embodiment, the method for specifying scope of disclosure is not limited to this.

For example, if a plurality of hairstyle images are obtained in step S10, the user may initially specify a desired hairstyle image. That is, the information processing unit 105 reads the hairstyle images from the storage unit 103, displays the hairstyle images on the notification unit 102, and receives specification of a desired image.

Figure 7:
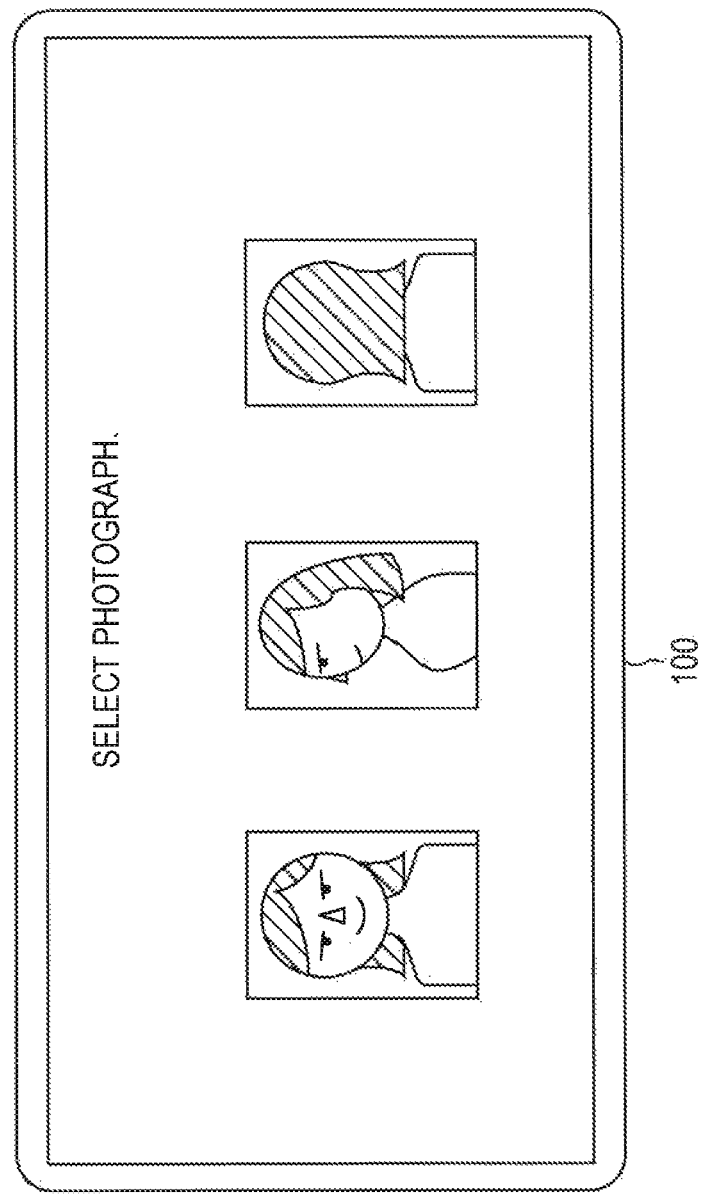
FIG. 7 is a diagram illustrating a display screen according to the first embodiment of the present disclosure.

FIG. 7 is a diagram illustrating an example of the display screen according to this embodiment. More specifically, the information processing unit 105 displays the plurality of hairstyle images obtained in S10 on the notification unit 102 and receives specification of one of the plurality of hairstyle images from the input unit 101.

The device 100 then transmits the desired image to the server apparatus 200, and the server apparatus 200 identifies an optimal scope of disclosure of the desired image on the basis of information obtained from the SNS server apparatus 200a. Alternatively, the server apparatus 200 arranges a plurality of candidates for the scope of disclosure of the desired image in order of suitability on the basis of the information obtained from the SNS server apparatus 200a.

The server apparatus 200 then generates presentation information for asking the user whether to disclose the desired image within the identified optimal scope of disclosure. Alternatively, the server apparatus 200 generates, for the device 100, presentation information that enables the user to select one of the plurality of categories of the scope of disclosure arranged in order of suitability, the presentation information displaying the plurality of categories of the scope of disclosure in order of suitability or displaying an optimal scope of disclosure at the center. The server apparatus 200 then transmits the generated presentation information to the device 100.

The device 100 then displays presentation information for asking the user whether to disclose the desired image within the identified optimal scope of disclosure and receives a response from the user.

FIG. 8A is a diagram illustrating an example of the displayed presentation information according to this embodiment. For example, "acquaintances" is used as the desired scope of disclosure. If "yes" displayed on the display screen is selected using the input unit 101 in FIG. 8A, "acquaintances" is determined as the user's desired scope of disclosure. On the other hand, if "no" displayed on the display screen is selected, "acquaintances" is not determined as the user's desired scope of disclosure.

Alternatively, presentation information that enables the user to select one of the plurality of categories of the scope of disclosure arranged in order of suitability is displayed, and selection of one of the plurality of categories of the scope of disclosure by the user is received.

Figure 8B:
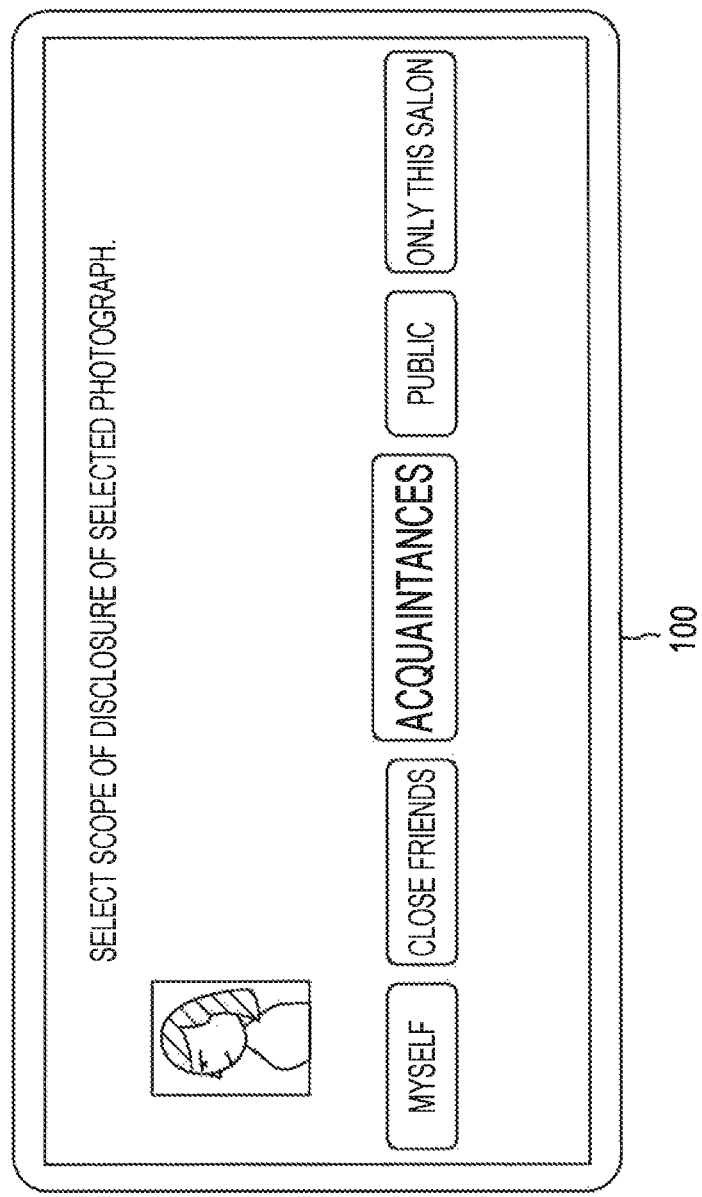
FIG. 8B is a diagram illustrating another example of the displayed presentation information according to the first embodiment.

FIG. 8B is a diagram illustrating another example of the displayed presentation information according to this embodiment. In FIG. 8B, "myself", "close friends", "acquaintances", "public", or "only this salon" can be selected as the scope of disclosure. If any of the above categories of the scope of disclosure is selected using the input unit 101 in FIG. 8B, the selected category of the scope of disclosure is received.

Thus, after selecting a desired image, the user can easily determine or select an optimal scope of disclosure that suits the desired image.

Alternatively, for example, the user may register a plurality of hairstyle images and/or a plurality of comments for a single scope of disclosure.

Alternatively, for example, the displayed second presentation information need not include a plurality of hairstyle images as in FIGS. 6A and 6B, but, for example, may include only a hairstyle image selected by the information generation unit 204. FIGS. 9A and 9B illustrate examples of this case. In FIG. 9A, only a hairstyle image, which is captured at the angle of "right side", selected by the information generation unit 204 is displayed at the center of the screen and recommended to the user as an optimal image that suits the scope of disclosure "public". In FIG. 9B, only a hairstyle image, which is captured at the angle of "front", selected by the information generation unit 204 is displayed at the center of the screen and recommended to the user as an optimal image that suits the scope of disclosure "close friends". In FIG. 9A or 9B, the user can display another hairstyle image captured at a different angle by operating (for example, a touch operation or the like) buttons such as "turn left" and "turn right". For example, if "turn left" is operated in FIG. 9A, a hairstyle image captured at the angle of "front" is displayed, and if "turn right" is operated, a hairstyle image captured at the angle of "back" is displayed.

In addition, for example, when selecting an image to be posted, the user may be enabled to specify a portion to be pixelized (hereinafter referred to as a "pixelization portion"). The pixelization portion can be specified for each scope of disclosure. FIGS. 10A and 10B illustrate examples of this case. FIG. 10A illustrates a case in which after selecting a hairstyle image captured at the angle of "front" as an image to be posted within the scope of disclosure "public", the user specifies his/her face as a pixelization portion and sets a desired degree of pixelization (also referred to as "definition"). In FIG. 10A, the user can change the degree of pixelization by operating (for example, a touch operation or the like) buttons such as "+" and "−". On the other hand, FIG. 10B illustrates a case in which after selecting a hairstyle image captured at the angle of "front" as an image to be posted with the scope of disclosure "close friends", the user does not specify a pixelization portion. The pixelization portion and the degree of pixelization specified as in FIG. 10A are transmitted to the server apparatus 200 from the device 100 as the third registration information. The server apparatus 200 performs image processing in the pixelization portion specified in the image in accordance with the specified degree of pixelization and stores the image in the storage unit 203. Although the pixelization has been described with reference to the examples illustrated FIGS. 9A and 9B, a pixelization portion may be specified and the degree of pixelization may be set in the same manner in the examples illustrated FIGS. 6A and 6B.

In addition, for example, the posting time is not limited to the time at which an image or the like is read in the device 100. For example, the posting time may be a time at which the server apparatus 200 registers the third registration information to the storage unit 203.

Alternatively, for example, the evaluation target is not limited to hairstyles, but may be nail designs or makeups.

Configurations According to Second Embodiment

The configuration of an information posting support system according to this embodiment is basically the same as that of the information posting support system according to the first embodiment illustrated in FIG. 2. Differences from the first embodiment will be described hereinafter.

First, the configuration of the device 100 will be described.

For example, after receiving, from the user, a request to display the third presentation information input using the input unit 101, the information processing unit 105 causes the information transmission/reception unit 104 to transmit the request to display the third presentation information to the server apparatus 200. The third presentation information is image information that enables the user to see the posted image and the posted comment and that configures a webpage for receiving comments and/or evaluations of the posted image from other users (refer to FIG. 12, which will be referred to later).

In addition, for example, the information processing unit 105 displays, on the notification unit 102, the third presentation information received by the information transmission/reception unit 104 from the server apparatus 200.

In addition, for example, upon receiving another user's comment and/or evaluation from the input unit 101 after the third presentation information is presented, the information processing unit 105 causes the information transmission/reception unit 104 to transmit another user's comment and/or evaluation to the server apparatus 200 as the fourth registration information.

The configuration of the device 100 has been described.

Next, the configuration of the server apparatus 200 will be described.

For example, the storage unit 203 stores template data regarding the third presentation information.

For example, after the information transmission/reception unit 201 receives a request to display the third presentation information from the device 100, the information generation unit 204 generates the third presentation information. Details of the generation process will be described later.

In addition, for example, the information generation unit 204 causes the information transmission/reception unit 201 to transmit the generated third presentation information to the device 100.

In addition, for example, after the information transmission/reception unit 201 receives the fourth registration information from the device 100, the information generation unit 204 registers the fourth registration information to the storage unit 203. Details of the registration process will be described later.

The configuration of the server apparatus 200 has been described.

Operations According to Second Embodiment

FIG. 11A is a block diagram illustrating an example of the configuration of the information posting support system according to the second embodiment of the present disclosure. In FIG. 11A, components that are the same as or that correspond to those illustrated in FIG. 2 are given the same reference numerals. Detailed description of the components given the same reference numerals as those illustrated in FIG. 2 is omitted.

In FIG. 11A, a device 100a is illustrated. For example, the user (first user) who uses the device 100 and a user (second user) who uses the device 100a are different from each other. Registration information corresponding to the user who uses the device 100 and the user who uses the device 100a is registered, for example, in the data table illustrated in FIG. 3.

FIG. 11B is a diagram illustrating an example of a data table according to this embodiment. For example, one of users included in information (a field c illustrated in FIG. 11B) regarding scope of disclosure corresponding to the user who uses the device 100 is the user who uses the device 100a.

In addition, for example, one of users included in information (the field c illustrated in FIG. 3) regarding scope of disclosure corresponding to the user who uses the device 100a is the user who uses the device 100.

The specific configuration of the device 100a is, for example, the same as that of the device 100, and accordingly description thereof is omitted here.

Next, an example of a procedure of a process for supporting posting of information performed by the information posting support system (the device 100 and the server apparatus 200) according to this embodiment will be described.

Figure 12:
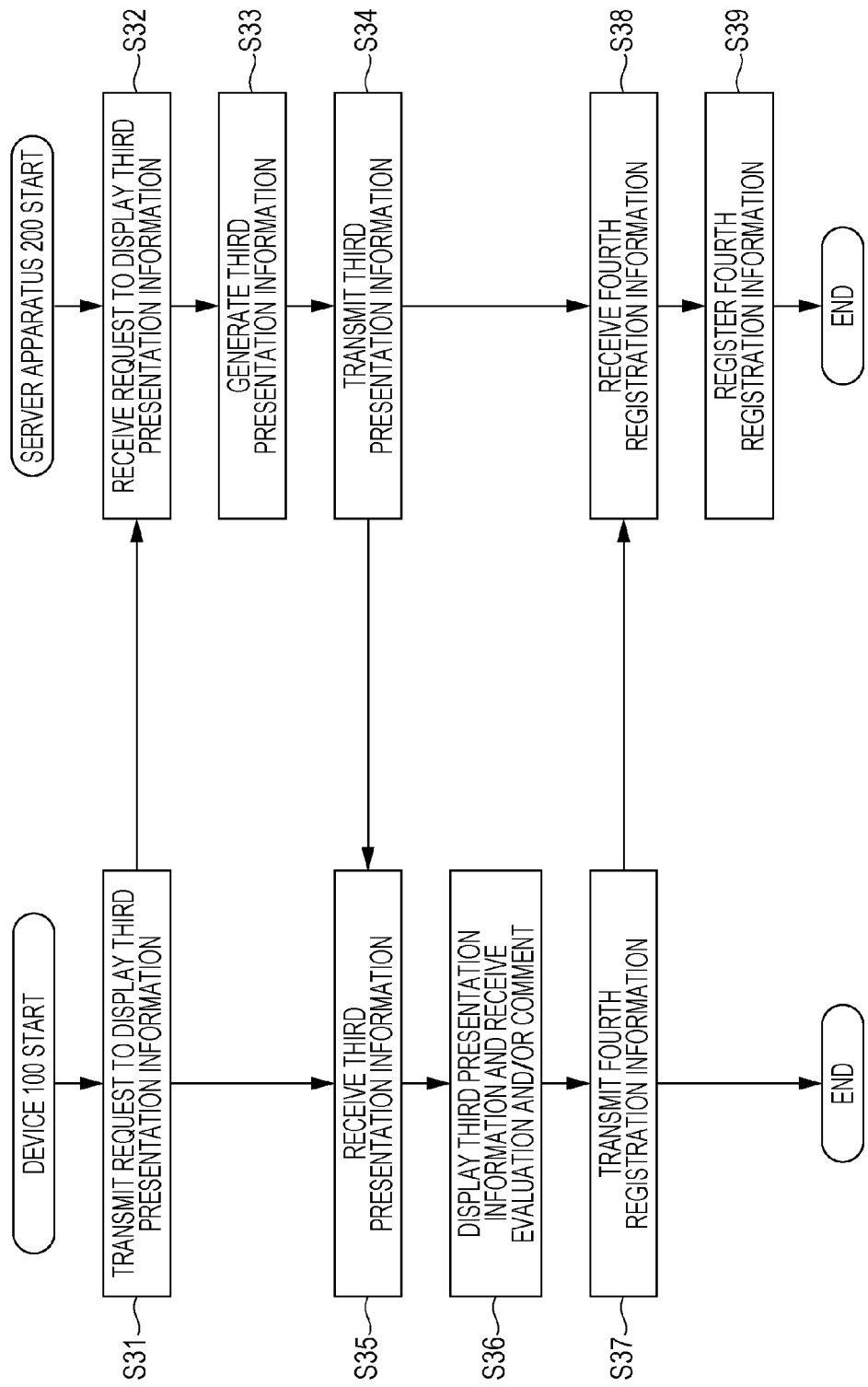
FIG. 12 is a flowchart illustrating an example of a procedure of a process for supporting posting of information performed by the information posting support system according to the second embodiment of the present disclosure.

FIG. 12 is a flowchart illustrating an example of the procedure of the process for supporting posting of information performed by the information posting support system according to this embodiment.

In the flowchart of FIG. 12, processing performed between the device 100 and the server apparatus 200 will be mainly described, but the same holds true for processing performed between the device 100a and the server apparatus 200. In step S31, the information processing unit 105 of the device 100 causes the information transmission/reception unit 104 to transmit a request to display the third presentation information (refer to FIG. 13, which will be referred to later) to the server apparatus 200.

For example, upon receiving the request (hereinafter referred to as a "display request") to display the third registration information made by the user using the input unit 101, the information processing unit 105 reads a user ID from the storage unit 103. The information processing unit 105 then causes the information transmission/reception unit 104 to transmit the user ID and the display request to the server apparatus 200. Although the user ID transmitted here is stored in the storage unit 103 in advance, the user ID may be input using the input unit 101 when the display request is transmitted.

In step S32, the information transmission/reception unit 201 of the server apparatus 200 receives the display request transmitted from the device 100.

In step S33, upon receiving the display request, the information generation unit 204 generates the third presentation information on the basis of posted images, posted comments, and the like stored in the storage unit 203.

Now, a specific example of a process for generating the third presentation information will be described hereinafter.

First, the information generation unit 204 searches, on the basis of the user ID (hereinafter referred to as a "received user ID") received along with the display request, the data table illustrated in FIG. 3 for posted images and posted comments disclosed to a user corresponding to the received user ID.

For example, a case in which the received user ID is "1111" will be described. In this case, the user (first user) who uses the device 100 has transmitted the display request to the server apparatus 200 from the device 100. At this time, the information generation unit 204 refers to the data table illustrated in FIG. 11B to identify a user whose scope of disclosure includes the user corresponding to the received user ID "1111". In FIG. 11B, the scope of disclosure of a user corresponding to a user ID "1001" includes "close friend ID". The user corresponding to the user ID "1001" includes the user ID "1111" in the "close friend ID".

Therefore, the information generation unit 204 of the server apparatus 200 detects that the user corresponding to the user ID "1001" is disclosing the posted images and the posted comments associated with the user ID "1001" to the user corresponding to the received user ID "1111".

For example, a case in which the received user ID is "1001" will be described. In this case, the user (second user) who uses the device 100a has transmitted the display request to the server apparatus 200 from the device 100a. In this case, the information generation unit 204 detects that, in the data table illustrated in FIG. 11B, the "close friend ID" of the user corresponding to the user ID "1111" includes the user ID "1001" and the scope of disclosure includes "close friend ID". As a result, the information generation unit 204 determines that the posted images and the posted comments associated with the user ID "1111" are disclosed to the user corresponding to the received user ID "1001".

If "public" is registered as the scope of disclosure, the information generation unit 204 unconditionally determines that the posted images and the posted comments associated with the scope of disclosure are disclosed to the user corresponding to the received user ID. On the other hand, if the received user ID is not included in the category registered as the scope of disclosure, the information generation unit 204 determines that the posted images and the posted comments associated with the scope of disclosure are not disclosed to the user corresponding to the received user ID.

Next, the information generation unit 204 reads, from the storage unit 203, the posted images, the posted comments, and the posting times disclosed to the user corresponding to the received user ID and the others' comments and the evaluations associated with the posted images, the posted comments, and the posting times. In the following description, the posted images, the posted comments, the posting times, the others' comments, and the evaluations that have been read from the storage unit 203 will be collectively referred to as "posted information". The information generation unit 204 also reads the template data for generating the third presentation information from the storage unit 203.

The information generation unit 204 then processes the template data such that the posted information is displayed in reverse chronological order. The information generation unit 204 also processes the template data such that an evaluation input button and a comment input button (will be described later with reference to FIG. 13) are displayed for each piece of the posted information. The processed template data will be referred to as "third presentation information" hereinafter.

A specific example of the process for generating the third presentation information has been described.

In step S34, the information generation unit 204 causes the information transmission/reception unit 201 to transmit the third presentation information to a device corresponding to the received user ID. For example, if the received user ID is "1111", the device to which the third presentation information is transmitted is the device 100. For example, if the received user ID is "1001", the device to which the third presentation information is transmitted is the device 100a. In the following example, a case in which the device to which the third presentation information is transmitted is the device 100 (that is, a case in which the received user ID is "1111") will be described.

In step S35, the information transmission/reception unit 104 of the device 100 receives the third presentation information transmitted from the server apparatus 200. The information processing unit 105 stores the third presentation information received by the information transmission/reception unit 104 in the storage unit 103.

In step S36, the information processing unit 105 reads the third presentation information from the storage unit 103 and causes the notification unit 102 to display the third presentation information, in order to receive others' comments and/or evaluations.

Figure 13:
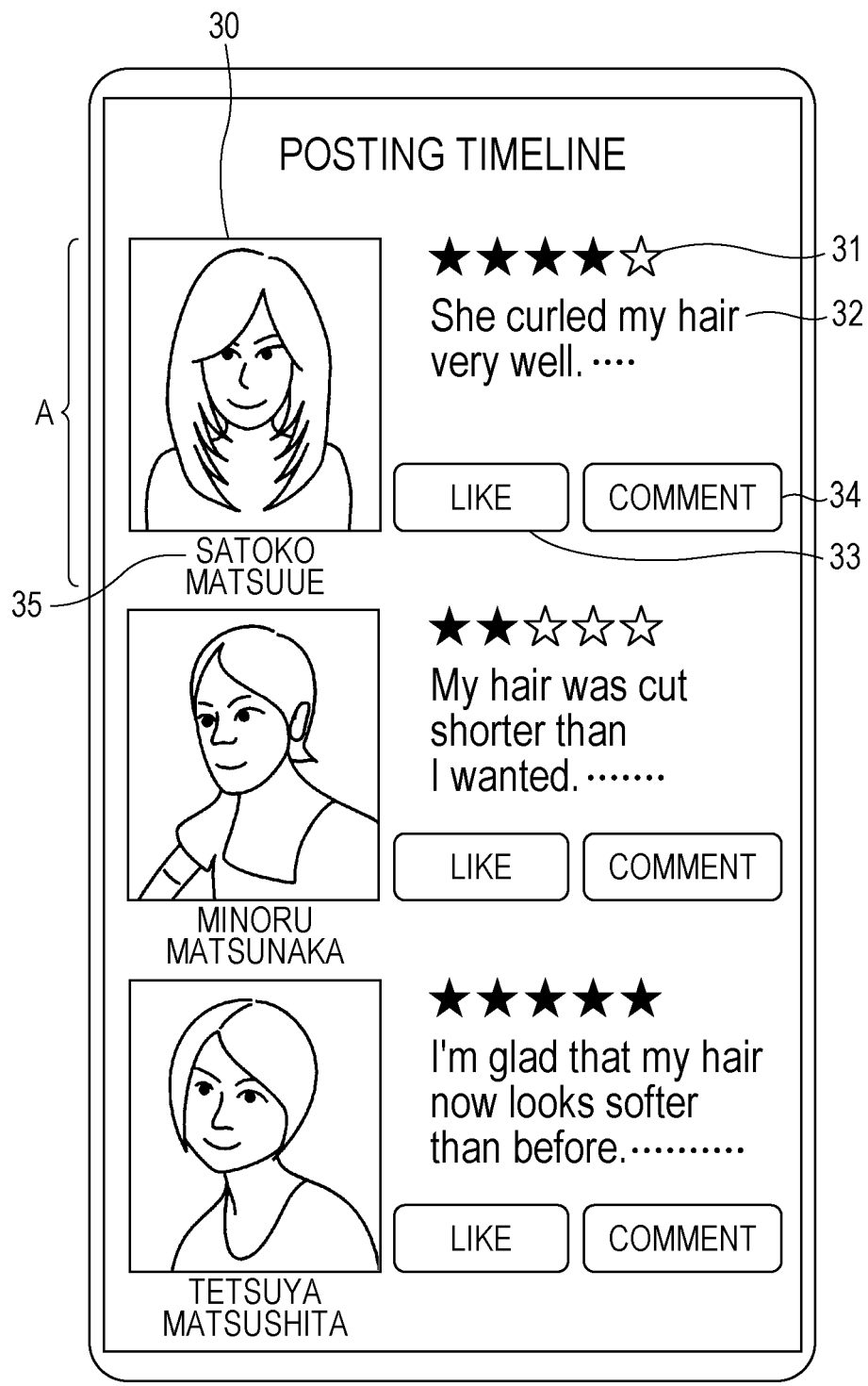
FIG. 13 is a diagram illustrating an example of displayed third presentation information according to the second embodiment of the present disclosure.

Now, an example of the third presentation information displayed in the device 100 will be described with reference to FIG. 13. FIG. 13 illustrates an example of the displayed third presentation information.

In FIG. 13, three pieces of posted information are displayed in reverse chronological order. For example, Information A, which is an example of newest posted information, will be described. In Information A, a posted image 30, an evaluation 31, a posted comment 32, an evaluation input button 33, a comment input button 34, and a stylist name button 35 are displayed.

The posted image 30 is a posted image registered in the field d illustrated in FIG. 3.

The evaluation 31 is an image that reflects a value registered in the field e illustrated in FIG. 11B. In the example illustrated in FIG. 13, the number of stars increases as the value indicating the evaluation exceeds each of thresholds. Therefore, more stars indicate a larger number of times that the evaluation input button 33 has been operated.

The posted comment 32 is a posted comment registered in a field d illustrated in FIG. 11B. If, for example, a touch operation is performed on a portion in which the posted comment 32 is displayed, the entirety of the posted comment is displayed. In addition to the entirety of the posted comment 32, the others' comments registered in a field e illustrated in FIG. 11B are displayed.

The evaluation input button 33 is a button that enables a user other than the poster to easily express his/her fondness for the posted image 30 and the posted comment 32. The number of times that the evaluation input button 33 has been operated is transmitted to the server apparatus 200 as the fourth registration information and registered to the "evaluation" in the field e illustrated in FIG. 11B.

The comment input button 34 is a button that enables a user other than the poster to input a specific comment (for example, a thought on the hairstyle, the hair salon, or the stylist or a question to the poster) on the posted image 30 and the posted comment 32. If the comment input button 34 is operated, a comment input field is displayed, and the user can input an arbitrary comment to the comment input field. The input comment is transmitted to the server apparatus 200 as the fourth registration information and registered to the "others' comments" in the field e illustrated in FIG. 11B. Not only a user other than the poster of the posted image 30 and the posted comment 32 but also the poster of the posted image 30 and the posted comment 32 can input a comment using the comment input button 34. In this embodiment, comments input using the comment input button 34 will be referred to as "others' comments", regardless of whether the poster or a user other than the poster has input the comments, in order to simplify the description.

The stylist name button 35 indicates the name of a stylist who arranged the hairstyle included in the posted image 30. The name of the stylist is, for example, registered in a field b illustrated in FIG. 11B along with a stylist ID or by itself. Although not illustrated in FIG. 11B, profile information (for example, a face image, a birthplace, hobbies, a message to customers, and the like) regarding the stylist is associated with the name of the stylist.

Although three pieces of posted information are displayed in FIG. 13 as an example, other pieces of posted information can be displayed through an operation (for example, a flick operation or the like) performed by the user.

Upon receiving a comment and/or an evaluation, the information processing unit 105 stores the comment and/or the evaluation in the storage unit 103 along with the corresponding posted image (may be information for identifying the posted image; the same holds true for the following description).

In step S37, the information processing unit 105 causes the information transmission/reception unit 104 to transmit the fourth registration information to the server apparatus 200.

For example, the information processing unit 105 reads, from the storage unit 103, the user ID, the input comment and/or evaluation, and the posted image. The information processing unit 105 determines the comment and/or the evaluation and the posted image as the fourth registration information and adds a user ID to the fourth registration information. The information processing unit 105 then causes the information transmission/reception unit 104 to transmit the fourth registration information to the server apparatus 200. As in the transmission of the first registration information, the user ID added to the fourth registration information may be stored in the storage unit 103 in advance, or may be input using the input unit 101 when the fourth registration information is transmitted.

In step S38, the information transmission/reception unit 201 of the server apparatus 200 receives the fourth registration information transmitted from the device 100.

In step S39, the information registration unit 202 registers the fourth registration information received by the information transmission/reception unit 201 to the storage unit 203.

For example, assume that in FIG. 11B, the preliminary registration information (refer to a field a), the first registration information (refer to the field b), the second registration information (refer to the field c), and the third registration information (refer to the field d) have been registered. The information registration unit 202 registers other pieces of registration information (that is, a comment and/or an evaluation) as the fourth registration information (refer to the field e) while associating the fourth registration information with the received image. Thereafter, the information registration unit 202 outputs, to the information generation unit 204, information (hereinafter referred to as "fourth registration completion information") indicating that the fourth registration information has been registered.

After receiving the fourth registration completion information, the information generation unit 204 generates, as described above, the third presentation information and causes the information transmission/reception unit 201 to transmit the third presentation information to the device 100, each time a display request is received from the device 100. As a result, the device 100 can display updated third presentation information.

If the stylist name button 35 is operated in the screen illustrated in FIG. 13, the information processing unit 105 stores information regarding the name of the stylist in the storage unit 103. The information processing unit 105 causes the information transmission/reception unit 104 to transmit the information to the server apparatus 200. After the information transmission/reception unit 201 of the server apparatus 200 receives the information regarding the name of the stylist, the information generation unit 204 obtains the profile information associated with the received information from the storage unit 203. The information generation unit 204 then transmits the obtained profile information to the device 100 from the information transmission/reception unit 201. After the information transmission/reception unit 104 of the device 100 receives the profile information, the information processing unit 105 stores the profile information in the storage unit 103. Thereafter, the information processing unit 105 reads the profile information from the storage unit 103 and causes the notification unit 102 to display the profile information. As a result, the notification unit 102 displays the profile information, and the user can see the profile of the selected stylist.

Thus, according to the information posting support system according to this embodiment, images posted by a plurality of users can be disclosed while protecting privacy. In addition, comments on the posted images can be received and disclosed. As a result, a third party who has not gone to any of the hair salons can evaluate the images posted by others, and accordingly posted content (for example, posted images, posted comments, and the like) can be richer than in a restaurant evaluation website or a product evaluation website, where a user needs to actually use a restaurant or a product to make an evaluation.

The first embodiment and the second embodiment may be modified in various ways without deviating the scope thereof.

Functions Realized by Computer Program

Although the first and second embodiments of the present disclosure have been described in detail with reference to the drawings, the functions of the device 100 and the server apparatus 200 (hereinafter referred to as "apparatuses") can be realized by a computer program.

Figure 14:
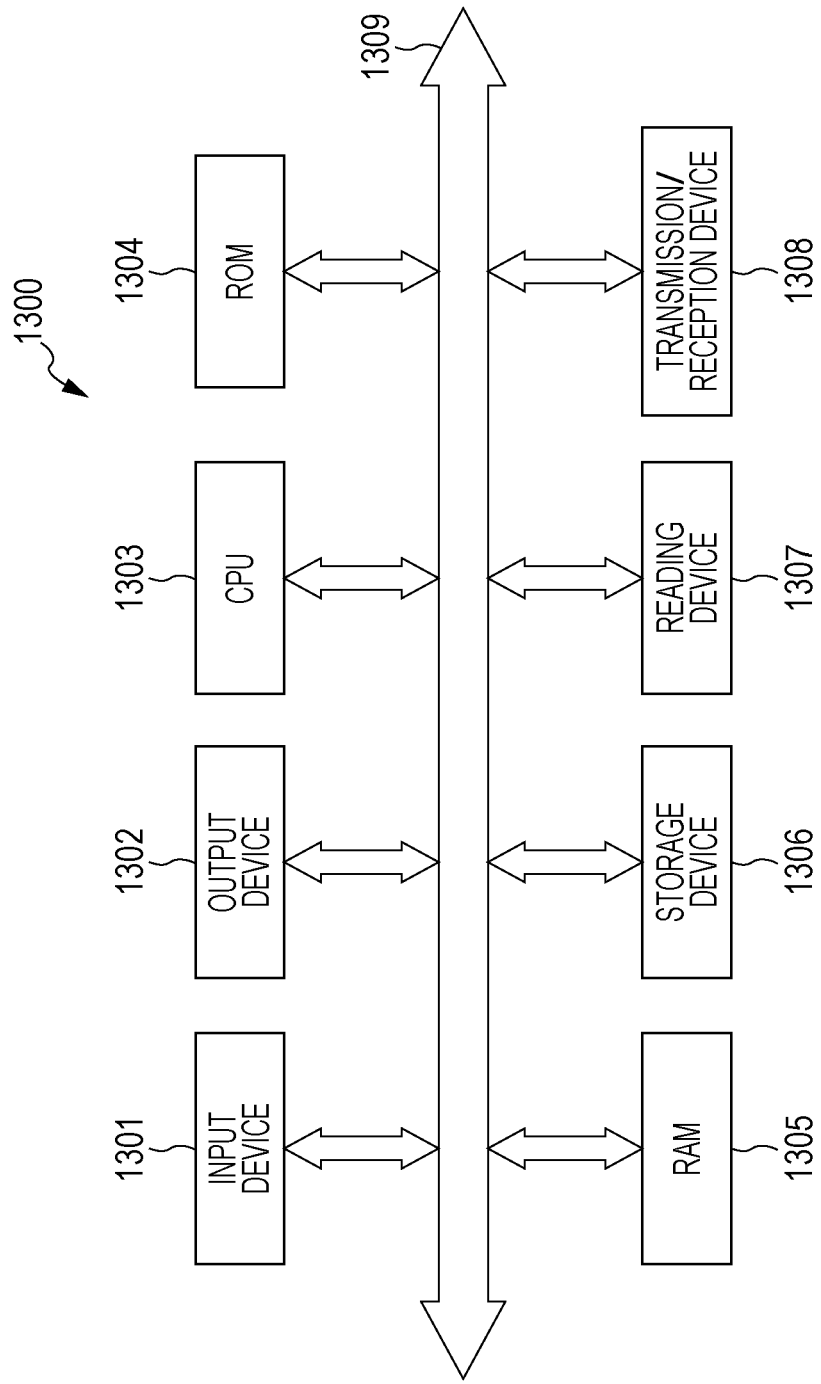
FIG. 14 is a diagram illustrating an example of the hardware configuration of a computer that realizes functions of a device and a server apparatus according to any of the embodiments of the present disclosure using software.

FIG. 14 is a diagram illustrating the hardware configuration of a computer that realizes the functions of the apparatuses using a program. A computer 1300 includes an input device 1301 such as a keyboard, a mouse, or a touchpad, an output device 1302 such as a display or a speaker, a central processing unit (CPU) 1303, a read-only memory (ROM) 1304, a random-access memory (RAM) 1305, a storage device 1306 such as a hard disk device or a solid-state drive (SSD), a reading device 1307 that reads information from a recording medium such as a digital versatile disk read-only memory (DVD-ROM) or a Universal Serial Bus (USB) memory, and a transmission/reception device 1308 that performs communication through a network. These components are connected to one another by a bus 1309.

The reading device 1307 reads the program from the recording medium storing the program for realizing the functions of the apparatuses and stores the program in the storage device 1306. Alternatively, the transmission/reception device 1308 communicates with a server apparatus connected to the network and stores the program for realizing the functions of the apparatuses downloaded from the server apparatus in the storage device 1306.

The CPU 1303 then copies the program stored in the storage device 1306 to the RAM 1305 and sequentially reads commands included in the program from the RAM 1305 to execute the commands, thereby realizing the functions of the apparatuses.

Types of Cloud Service

The techniques described in the above embodiments are, for example, realized in the following types of cloud service. The types in which the techniques described in the above embodiments are realized, however, are not limited to the following.

Service Type 1: In-house Data Center

Figure 15:
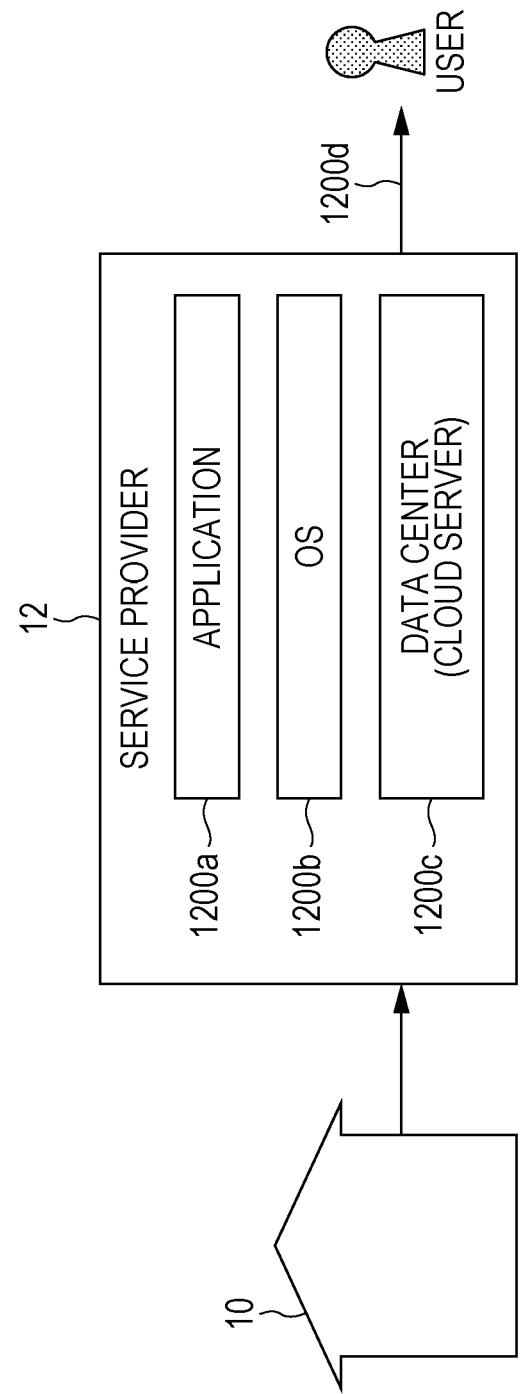
FIG. 15 is a diagram illustrating an example of Service Type 1 (in-house data center) according to the embodiments of the present disclosure.

FIG. 15 is a diagram illustrating an example of Service Type 1 (in-house data center). This is a type in which the service provider 12 obtains information from the group 10 and provides a service for a user. In this type, the service provider 12 has the function of a data center management company 11. That is, the service provider 12 holds the cloud server 11*a* that controls big data. Therefore, there is no data center management company 11.

In this type, the service provider 12 manages and controls a data center 1200*c* (cloud server 11*a*). The service provider 12 also controls an operating system (OS) 1200*b* and an application 1200*a*. The service provider 12 provides a service (1200*d*) using the OS 1200*b* and the application 1200*a* controlled by the service provider 12.

Service Type 2: Use of IaaS

Figure 16:
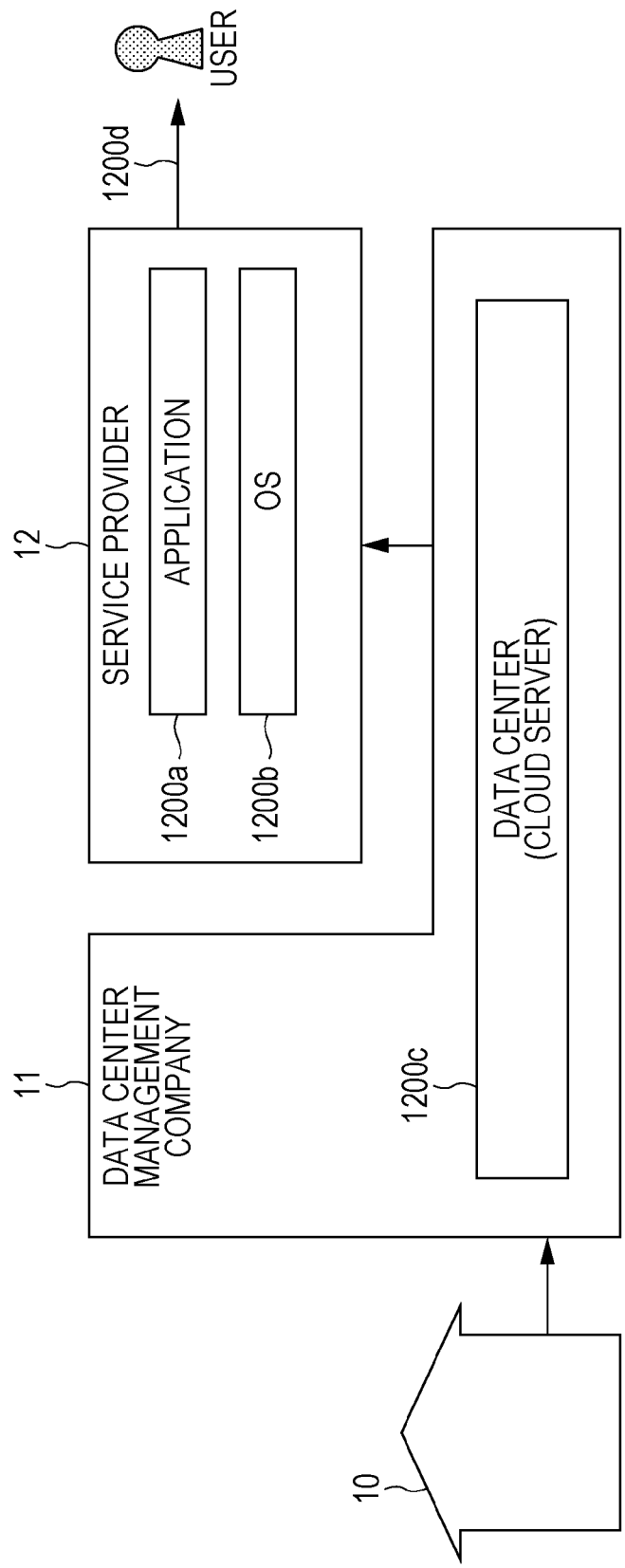
FIG. 16 is a diagram illustrating an example of Service Type 2 (use of an Infrastructure as a Service (IaaS)) according to the embodiments of the present disclosure.

FIG. 16 is a diagram illustrating an example of Service Type 2 (use of an IaaS). IaaS is an acronym for an "Infrastructure as a Service", which is a cloud service provision model that provides a basis for constructing and operating a computer system as a service provided through the Internet.

In this type, the data center management company 11 manages and controls the data center 1200*c* (cloud server 11*a*). The service provider 12 controls the OS 1200*b* and the application 1200*a*. The service provider 12 provides a service (1200*d*) using the OS 1200*b* and the application 1200*a* controlled by the service provider 12.

Service Type 3: Use of PaaS

Figure 17:
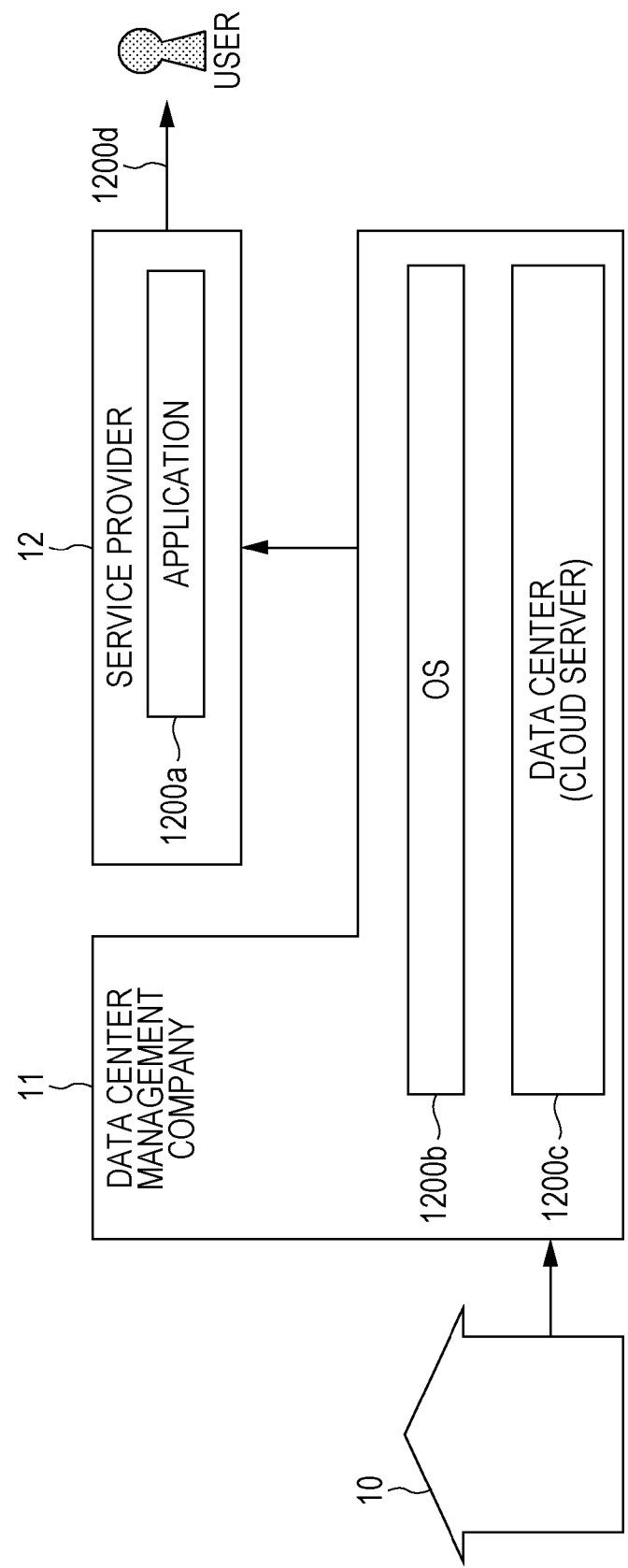
FIG. 17 is a diagram illustrating an example of Service Type 3 (use of a Platform as a Service (PaaS)) according to the embodiments of the present disclosure.

FIG. 17 is a diagram illustrating an example of Service Type 3 (use of a PaaS). PaaS is an acronym for a "Platform as a Service", which is a cloud service provision model that provides a platform that serves as a basis for constructing and operating software as a service provided through the Internet.

In this type, the data center management company 11 controls the OS 1200*b* and manages and controls the data center 1200*c* (cloud server 11*a*). The service provider 12 also controls the application 1200*a*. The service provider 12 provides a service (1200*d*) using the OS 1200*b* controlled by the data center management company 11 and the application 1200*a* controlled by the service provider 12.

Service Type 4: Use of SaaS

Figure 18:
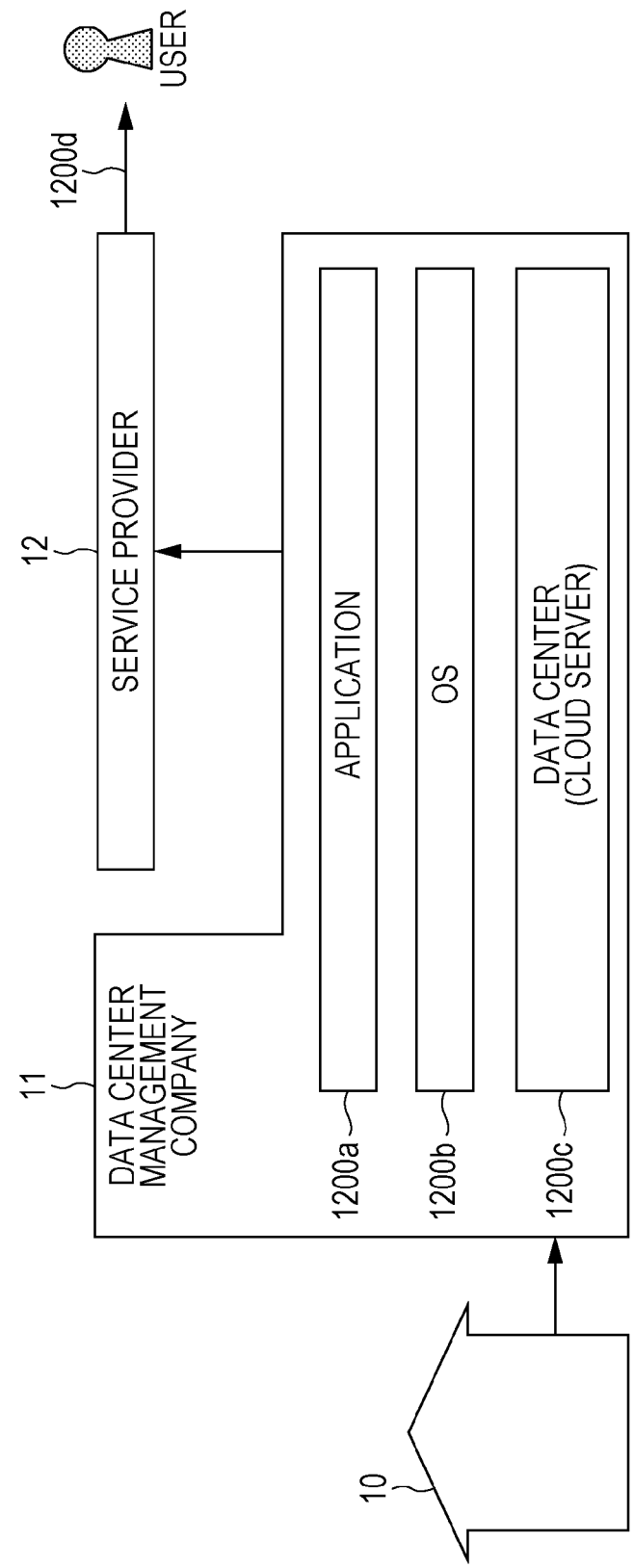
FIG. 18 is a diagram illustrating an example of Service Type 4 (use of Software as a Service (SaaS)) according to the embodiments of the present disclosure.

FIG. 18 is a diagram illustrating an example of Service Type 4 (use of SaaS). SaaS is an acronym for "Software as a Service", which is, for example, a cloud service provision model having a function of enabling a company or a person (user) who does not own a data center (cloud server) to use, through a network such as the Internet, an application provided by a platform provider owning a data center (cloud server).

In this type, the data center management company 11 controls the application 1200*a* and the OS 1200*b* and manages and controls the data center 1200*c* (cloud server 11*a*). The service provider 12 provides a service (1200*d*) using the OS 1200*b* and the application 1200*a* controlled by the data center management company 11.

In any of the above types, the service provider 12 provides a service. In addition, for example, the service provider 12 or the data center management company 11 may develop its own OS, application, database for big data, or the like, or may outsource the development work.

The techniques disclosed in the present disclosure are effective in a terminal apparatus that supports posting of an image on a website, a server apparatus, a method for supporting posting of information, and a non-transitory recording medium storing a computer program.

What is claimed is:

1. A terminal apparatus that communicates with a server apparatus that provides a first website, the terminal apparatus comprising:
   a receiver that receives, from the server apparatus, first webpage information, wherein the first webpage information is configured to enable a first user to specify an image to be posted on the first website;
   a storage that stores the first webpage information received by the receiver; and
   an information processor that reads the first webpage information from the storage and that displays the first webpage information on a screen,
   wherein, on the screen, among a plurality of images of the first user, which are candidates for the image to be posted on the first website, an image selected on the basis of a capture angle of an image of the first user used in a second website is (i) displayed at a position closer to the center of the screen than positions of other images, (ii) displayed with a size larger than sizes of the other images, (iii) displayed with lines surrounding the selected image, or (iv) displayed such that the selected image flashes.

2. The terminal apparatus according to claim 1,
wherein, the plurality of images of the first user are a plurality of images of the first user's head captured at different angles,
wherein, the image of the first user used in the second website is an image of the first user's head used in the second website, and
wherein, on the screen, the plurality of images of the first user's head captured at different angles are displayed as the candidates for the image to be posted on the first website.

3. The terminal apparatus according to claim 2,
wherein, on the screen, the selected image of the first user's head is displayed at the center of the screen and is displayed with the size larger than the sizes of the other images.

4. The terminal apparatus according to claim 2,
wherein the receiver receives, from the server apparatus, second webpage information including an image posted by a second user, wherein a scope of disclosure of the image posted by the second user includes the first user,
wherein the information processor stores the second webpage information in the storage, and then reads the second webpage information from the storage and displays the second webpage information on the screen, and
wherein the posted image and an input button configured to enable the first user to input a comment on the posted image are displayed on the screen.

5. The terminal apparatus according to claim 1,
wherein the first webpage information is separately displayed on the screen in accordance with a scope of disclosure of each image posted on the first website,
wherein the scope of disclosure is specified by the first user before the first webpage information is separately displayed.

6. The terminal apparatus according to claim 1,
wherein, the storage includes a memory, and
wherein, at least one of the receiver and the information processor includes a processor.

7. A server apparatus that provides a first website for a terminal apparatus, the server apparatus comprising:
a receiver that receives, from the terminal apparatus, a plurality of images of a first user, which are candidates for an image to be posted on the first website, and a first scope of disclosure specified by the first user as a scope within which the image to be posted on the first website is disclosed and that receives, from a second server apparatus, which provides a second website, an image of the first user posted on the second website and a second scope of disclosure within which the image of the first user posted on the second website is disclosed;
an information generator that, if the first scope of disclosure is included in the second scope of disclosure, selects, from among the plurality of images of the first user, an image captured at the same angle as a first capture angle of the image of the first user posted on the second website or an image captured at an angle which is closer to a second capture angle than the first capture angle, the second capture angle being an angle at which the front of the first user is captured, and that generates webpage information with which the selected image is (i) displayed at a position closer to the center of a screen than positions of other images, (ii) displayed with a size larger than sizes of the other images, (iii) displayed with lines surrounding the selected image or (iv) displayed such that the selected image flashes; and
a transmitter that transmits the webpage information to the terminal apparatus.

8. The server apparatus according to claim 7,
wherein the plurality of images of the first user are a plurality of images of the first user's head captured at different angles, and
wherein the image posted on the second website is an image of the first user's head posted on the second website.

9. The server apparatus according to claim 7,
wherein the plurality of images of the first user are a plurality of images of the first user's head captured at different angles,
wherein the image posted on the second website is an image of the first user's head posted on the second website, and
wherein, if the first scope of disclosure is wider than the second scope of disclosure, the information generator selects, from among the plurality of images of the first user's head, an image captured at an angle, which is closer to a third capture angle than the first capture angle, the third capture angle being an angle at which the back of the first user is captured.

10. The server apparatus according to claim 7,
wherein, at least one of the receiver, the information generator, and the transmitter includes a processor.

11. A method for supporting posting of information used by an information posting support system that provides a first website for a terminal apparatus, a computer of the information posting support system performing the method comprising:
receiving, from the terminal apparatus, a plurality of images of a first user, which are candidates for an image to be posted on the first website, and a first scope of disclosure specified by the first user as a scope within which the image to be posted on the first website is disclosed;
receiving, from a second server apparatus, which provides a second website, an image of the first user posted on the second website and a second scope of disclosure, which is a scope within which the image of the first user posted on the second website is disclosed;
if the first scope of disclosure is included in the second scope of disclosure, selecting, from among the plurality of images of the first user, an image captured at the same angle as a first capture angle of the image of the first user posted on the second website or an image captured at an angle which is closer to a second capture angle than the first capture angle, the second capture angle being an angle at which the front of the first user is captured;
generating webpage information with which the selected image is (i) displayed at a position closer to the center of a screen than positions of other images, (ii) displayed with a size larger than sizes of the other images, (iii) displayed with lines surrounding the selected image or (iv) displayed such that the selected image flashes; and
transmitting the webpage information to the terminal apparatus.

12. The method according to claim 11,
wherein the plurality of images of the first user are a plurality of images of the first user's head captured at different angles, and wherein the image posted on the second website is an image of the first user's head posted on the second website.

13. The method according to claim 11,
wherein the plurality of images of the first user are a plurality of images of the first user's head captured at different angles,
wherein the image posted on the second website is an image of the first user's head posted on the second website, and
wherein, in the selecting, if the first scope of disclosure is wider than the second scope of disclosure, an image captured at an angle, which is closer to a third capture angle than the first capture angle, the third capture angle being an angle at which the back of the first user is captured, is selected from among the plurality of images of the first user's head.

14. The method according to claim 11,
wherein, at least one of the receiving of the plurality of images and the first scope of disclosure, the receiving of the image of the first user posted on the second website and the second scope of disclosure, the selecting, the generating and the transmitting is performed by a processor.

15. A non-transitory computer-readable tangible recording medium storing a computer program for causing a computer that provides a first website for a terminal apparatus to execute:
receiving, from the terminal apparatus, a plurality of images of the first user, which are candidates for an image to be posted on the first website, and a first scope of disclosure specified by the first user as a scope within which the image to be posted on the first website is disclosed;
receiving, from a second server apparatus, which provides a second website, an image of the first user posted on the second website and a second scope of disclosure, which is a scope within which the image of the first user posted on the second website is disclosed;
if the first scope of disclosure is included in the second scope of disclosure, selecting, from among the plurality of images of the first user, an image captured at the same angle as a first capture angle of the image of the first user posted on the second website or an image captured at an angle which is closer to a second capture angle than the first capture angle, the second capture angle being an angle at which the front of the first user is captured;
generating webpage information with which the selected image is (i) displayed at a position closer to the center of a screen than positions of other images, (ii) displayed with a size larger than sizes of the other images, (iii) displayed with lines surrounding the selected image or (iv) displayed such that the selected image flashes; and
transmitting the webpage information to the terminal apparatus.

16. The non-transitory computer-readable tangible recording medium according to claim 15,
wherein the plurality of images of the first user are a plurality of images of the first user's head captured at different angles, and
wherein the image posted on the second website is an image of the first user's head posted on the second website.

17. The non-transitory computer-readable tangible recording medium according to claim 15,
wherein the plurality of images of the first user are a plurality of images of the first user's head captured at different angles,
wherein the image posted on the second website is an image of the first user's head posted on the second website, and
wherein, in the selecting, if the first scope of disclosure is wider than the second scope of disclosure, an image captured at an angle, which is closer to a third capture angle than the first capture angle, the third capture angle being an angle at which the back of the first user is captured, is selected from among the plurality of images of the first user's head.

* * * * *